(12) United States Patent
Wachspress et al.

(10) Patent No.: US 6,497,385 B1
(45) Date of Patent: Dec. 24, 2002

(54) ROTOR BLADE WITH OPTIMIZED TWIST DISTRIBUTION

(75) Inventors: Daniel A. Wachspress, Lawrenceville, NJ (US); Todd R. Quackenbush, Pennington, NJ (US)

(73) Assignee: Continuum Dynamics, Inc., Ewing, NJ (US)

( * ) Notice: Subject to any disclaimer, the term of this patent is extended or adjusted under 35 U.S.C. 154(b) by 0 days.

(21) Appl. No.: 10/006,747

(22) Filed: Nov. 8, 2001

Related U.S. Application Data
(60) Provisional application No. 60/246,576, filed on Nov. 8, 2000, and provisional application No. 60/246,577, filed on Nov. 8, 2000.

(51) Int. Cl.[7] ................. B64C 27/467; B64C 27/28
(52) U.S. Cl. ............... 244/7 R; 244/17.11; 244/39; 416/223 R
(58) Field of Search ............... 244/7 A, 17.11, 244/17.23, 17.25, 39, 7 R; 416/55, 223 R

(56) References Cited

U.S. PATENT DOCUMENTS

| | | | |
|---|---|---|---|
| 2,483,480 A | * 10/1949 | Stalker | 244/17.23 |
| 3,822,105 A | 7/1974 | Jepson | 416/223 |
| 4,248,572 A | 2/1981 | Fradenburgh | 416/228 |
| 4,324,530 A | 4/1982 | Fradenburgh et al. | 416/228 |
| 4,334,828 A | 6/1982 | Moffitt | 416/228 |
| 4,451,206 A | 5/1984 | Philippe et al. | 416/228 |
| 4,564,337 A | 1/1986 | Zimmer et al. | 416/223 R |
| 4,880,355 A | 11/1989 | Vuillet et al. | 416/228 |
| 4,927,330 A | 5/1990 | Asboth | 416/223 R |
| 4,975,022 A | * 12/1990 | Perry | 244/17.11 X |
| 5,035,577 A | 7/1991 | Damongeot | 416/223 R |
| 5,711,651 A | 1/1998 | Charles et al. | 416/24 |
| 5,735,670 A | * 4/1998 | Moffitt et al. | 244/17.11 X |
| 5,752,672 A | 5/1998 | McKillip, Jr. | 244/75 R |
| 5,992,793 A | * 11/1999 | Perry et al. | 244/17.11 |
| 6,000,911 A | 12/1999 | Toulmay et al. | 416/223 R |
| 6,168,383 B1 | 1/2001 | Shimizu | 416/228 |
| 6,190,132 B1 | 2/2001 | Yamakawa et al. | 416/228 |
| 6,220,550 B1 | 4/2001 | McKillip, Jr. | 244/215 |
| 6,231,308 B1 | 5/2001 | Kondo et al. | 416/228 |
| 6,364,615 B1 | * 4/2002 | Toulmay et al. | 416/223 R |

OTHER PUBLICATIONS

Johnson, W., *Helicopter Theory*, Princeton Univ. Press (1980), pp. 34–35, 64–93.

(List continued on next page.)

*Primary Examiner*—Robert P. Swiatek
(74) *Attorney, Agent, or Firm*—David M. Quinlan, P.C.

(57) ABSTRACT

A rotor blade has a local geometric twist angle $\theta=f(r/R)$, with R being the blade span and r being the distance along the blade span from the axis of rotation. The blade has an inner region between an $(r/R)_{inner}=0.20\pm0.04$ and a transition point at $(r/R)_{trans}=0.75\pm0.04$, wherein $\theta_{inner}$ at $(r/R)_{inner}$ has a positive value and is greater than or equal to $\theta_{trans}$ at $(r/R)_{trans}$. A blade tip region includes a first portion between $(r/R)_{trans}$ and $(r/R)_{min}>(r/R)_{trans}$, wherein $\theta$ continuously decreases from $\theta_{trans}$ to $\theta_{min}$ at $(r/R)_{min}$, and $\Delta\theta_{tip1}=|\theta_{min}-\theta_{trans}|>3°$, and a second portion between $(r/R)_{min}$ and the blade tip, wherein $\theta$ continuously increases from $\theta_{min}$ to $\theta_{tip}$ at the tip, and $\Delta\theta_{tip2}=|\theta_{tip}-\theta_{min}|$ is at least about 3° and no greater than about 20°. This geometry pushes the vortex trailed by the blade tip away from the blade and thus increases blade performance. In a preferred tiltrotor blade embodiment, $\Delta\theta_{inner}=|\theta_{inner}-\theta_{trans}|=32.5°\pm7.5°$, $\theta$ continuously decreases from $(r/R)_{inner}$ to $(r/R)_{trans}$, $(r/R)_{min}=0.91\pm0.04$, $\Delta\theta_{tip1}=7.5°\pm2.5°$, and $\Delta\theta_{tip2}=10°\pm6°$. In a preferred helicopter blade embodiment, $\Delta\theta_{inner}=|\theta_{inner}-\theta_{trans}|=20°\pm5°$, $\theta$ continuously decreases from $(r/R)_{inner}$ to $(r/R)_{trans}$, $(r/R)_{min}=0.94\pm0.04$, $\Delta\theta_{tip1}=5°\pm2°$, and $\Delta\theta_{tip2}$ is from about 3° to about 10°. Another embodiment of the invention uses adjustable flaps to control $\theta=f(r/R)$ in an inboard region of a helicopter blade to optimize performance in hover and forward flight regimes.

19 Claims, 15 Drawing Sheets

OTHER PUBLICATIONS

McVeigh, M.A., et al., "Aerodynamic Design of the XV–15 Advanced Composite Tilt Rotor Blade," *American Helicopter Society 39th Annual Forum*, St. Louis, MO, May 1983, pp. 72–80.

Johnson, W.R., "Wake Model for Helicopter Rotors in High Speed Flight," *NASA CR 177507*, Nov. 1988, p. 260.

McVeigh, M.A., et al., "Rotor/Airframe Interactions on Tiltrotor Aircraft," *American Helicopter Society 44th Annual Forum*, Washington, DC, Jun. 1988, pp. 43–51.

Quackenbush, T.R., et al., "Performance Optimization for Rotors in Hover and Axial Flight," *NASA CR 177524*, Apr. 1989.

Brunken, J.E., Jr., et al. "A Review of the V–22 Dynamics Validation Program," *American Helicopter Society 45th Annual Forum*, Boston, MA, May 1989, pp. 51–64.

Shanley, J.P., et al., "Systematic Correlation and Evaluation of the EHPIC Hover Analysis," *American Helicopter Society 46th Annual Forum*, Washington, DC, May 1990, pp. 1121–1133.

Quackenbush, T.R., et al., "Optimization of Rotor Performance in Hover Using A Free Wake Analysis," *Journal of Aircraft*, vol. 28, No. 3, Mar. 1991, pp. 200–207.

Quackenbush, T.R., "Rotor Design Optimization Using a Free Wake Analysis," *NASA CR 177612*, Apr. 1993.

Tung, C., et al., "Evaluation of Hover Performance Codes," *American Helicopter Society 50th Annual Forum*, Washington, DC, May 1994, pp. 829–844.

Davis, S.J., et al., "Aerodynamic Design Optimization of a Variable Diameter Tilt Rotor," *American Helicopter Society 51st Annual Forum*, Fort Worth, TX, May 1995, pp. 101–111.

Wachspress, D.A., et al., *EHPIC/HERO/WT (Mod 0.0) User's Manual*, C.D.I. Technical Note No. 94–16, Continuum Dynamics, Inc., May 1995.

Quackenbush, T.R., "Tilt Rotor Performance Enhancement Through Variable Twist Control," DoD Contract No. N00600–94–C–3119, SBIR Phase I Final Report, C.D.I. Rept. No. 95–07, Jun. 21, 1995, pp. 48–50.

Quackenbush, T.R., et al., "Blade–Mounted Devices for Tiltroter Performance Enhancement and Noise Reduction," NASA Contract No. NAS2–99029, SBIR Phase I Final Report, C.D.I. Rept. No. 99–07, Jul. 1999, pp. 27–30.

Quckenbush, T.R., et al., "Tiltrotor Performance Enhancement Using Variable Twist/Camber Control and Design Optimization," DoD Contr. No. N00421–96–C–1133, SBIR Phase II Final Report, C.D.I. Rept. No. 00–02, Apr. 2000, pp. 20–25.

Felker, F.F., "Accuracy of Tilt Rotor Hover Performance Predictions, "*NASA TM–104023*, Jun. 1993.

* cited by examiner-

OPTIMAL TWIST DISTRIBUTIONS-HELICOPTER BLADES FIG. 7

| r/R | 2-BLADED ROTOR | 3-BLADED ROTOR | 4-BLADED ROTOR | 5-BLADED ROTOR | 7-BLADED ROTOR |
|---|---|---|---|---|---|
| 0.206 | 27.08 | 27.08 | 24.41 | 24.95 | 25.58 |
| 0.219 | 26.57 | 26.57 | 24.05 | 24.60 | 25.20 |
| 0.231 | 26.07 | 26.07 | 23.68 | 24.26 | 24.82 |
| 0.244 | 25.57 | 25.57 | 23.32 | 23.91 | 24.45 |
| 0.256 | 24.86 | 24.86 | 22.85 | 23.44 | 23.96 |
| 0.269 | 23.95 | 23.95 | 22.27 | 22.85 | 23.36 |
| 0.281 | 23.04 | 23.04 | 21.69 | 22.25 | 22.76 |
| 0.294 | 22.13 | 22.13 | 21.11 | 21.66 | 22.17 |
| 0.306 | 21.18 | 21.18 | 20.51 | 21.06 | 21.56 |
| 0.319 | 20.19 | 20.19 | 19.89 | 20.44 | 20.93 |
| 0.331 | 19.21 | 19.21 | 19.27 | 19.82 | 20.31 |
| 0.344 | 18.22 | 18.22 | 18.65 | 19.20 | 19.68 |
| 0.356 | 17.42 | 17.42 | 18.05 | 18.60 | 19.08 |
| 0.369 | 16.80 | 16.80 | 17.46 | 18.02 | 18.49 |
| 0.381 | 16.18 | 16.18 | 16.87 | 17.44 | 17.91 |
| 0.394 | 15.56 | 15.56 | 16.28 | 16.85 | 17.32 |
| 0.406 | 15.00 | 15.00 | 15.61 | 16.21 | 16.64 |
| 0.419 | 14.48 | 14.48 | 14.86 | 15.49 | 15.85 |
| 0.431 | 14.02 | 14.02 | 14.23 | 14.89 | 15.19 |
| 0.444 | 13.62 | 13.62 | 13.72 | 14.38 | 14.66 |
| 0.456 | 13.25 | 13.25 | 13.28 | 13.92 | 14.17 |
| 0.469 | 12.89 | 12.89 | 12.91 | 13.51 | 13.72 |
| 0.481 | 12.53 | 12.53 | 12.54 | 13.12 | 13.27 |
| 0.494 | 12.18 | 12.18 | 12.18 | 12.75 | 12.82 |
| 0.506 | 11.80 | 11.80 | 11.84 | 12.39 | 12.41 |
| 0.519 | 11.39 | 11.39 | 11.51 | 12.02 | 12.04 |
| 0.531 | 11.03 | 11.03 | 11.18 | 11.66 | 11.67 |
| 0.544 | 10.71 | 10.71 | 10.86 | 11.32 | 11.32 |
| 0.556 | 10.42 | 10.42 | 10.55 | 10.99 | 10.98 |
| 0.569 | 10.15 | 10.15 | 10.25 | 10.68 | 10.67 |
| 0.581 | 9.88 | 9.88 | 9.97 | 10.37 | 10.37 |
| 0.594 | 9.61 | 9.61 | 9.70 | 10.07 | 10.08 |
| 0.606 | 9.37 | 9.37 | 9.44 | 9.79 | 9.81 |
| 0.619 | 9.16 | 9.16 | 9.18 | 9.52 | 9.53 |
| 0.631 | 8.92 | 8.92 | 8.95 | 9.25 | 9.26 |
| 0.644 | 8.66 | 8.66 | 8.74 | 8.97 | 8.97 |
| 0.656 | 8.42 | 8.42 | 8.53 | 8.71 | 8.72 |
| 0.669 | 8.21 | 8.21 | 8.33 | 8.46 | 8.49 |
| 0.681 | 8.01 | 8.01 | 8.13 | 8.21 | 8.27 |
| 0.694 | 7.82 | 7.82 | 7.95 | 7.97 | 8.06 |
| 0.706 | 7.62 | 7.62 | 7.76 | 7.74 | 7.85 |
| 0.719 | 7.43 | 7.43 | 7.58 | 7.52 | 7.64 |
| 0.731 | 7.24 | 7.24 | 7.40 | 7.30 | 7.43 |
| 0.744 | 7.07 | 7.07 | 7.22 | 7.07 | 7.22 |
| 0.756 | 6.90 | 6.90 | 7.04 | 6.83 | 6.99 |
| 0.769 | 6.74 | 6.74 | 6.84 | 6.58 | 6.74 |
| 0.781 | 6.56 | 6.56 | 6.63 | 6.31 | 6.47 |
| 0.794 | 6.37 | 6.37 | 6.41 | 6.02 | 6.19 |
| 0.806 | 6.16 | 6.16 | 6.18 | 5.71 | 5.85 |
| 0.819 | 5.95 | 5.95 | 5.93 | 5.38 | 5.48 |
| 0.831 | 5.69 | 5.69 | 5.66 | 5.02 | 5.08 |
| 0.844 | 5.39 | 5.39 | 5.35 | 4.62 | 4.65 |
| 0.856 | 5.11 | 5.11 | 5.01 | 4.17 | 4.17 |
| 0.869 | 4.83 | 4.83 | 4.64 | 3.67 | 3.61 |
| 0.881 | 4.57 | 4.57 | 4.23 | 3.13 | 3.03 |
| 0.894 | 4.32 | 4.32 | 3.78 | 2.57 | 2.42 |
| 0.906 | 4.01 | 4.01 | 3.39 | 2.02 | 1.82 |
| 0.919 | 3.64 | 3.64 | 3.06 | 1.50 | 1.23 |
| 0.931 | 3.44 | 3.44 | 2.91 | 1.25 | 0.93 |
| 0.944 | 3.43 | 3.43 | 2.94 | 1.29 | 0.91 |
| 0.956 | 3.98 | 3.98 | 3.35 | 1.74 | 1.26 |
| 0.969 | 5.11 | 5.11 | 4.11 | 2.59 | 1.99 |
| 0.981 | 6.17 | 6.17 | 4.88 | 3.40 | 2.75 |
| 0.992 | 7.17 | 7.17 | 5.65 | 4.17 | 3.52 |
| 1.00 | 7.90 | 7.90 | 6.21 | 4.73 | 4.08 |

TWIST DISTRIBUTIONS - TILTROLTOR BLADES ($C_T/\sigma = 0.16$)

FIG. 18A

| r/R | BLADE 1 | BLADE 2 | BLADE 3 | BLADE 4 |
|---|---|---|---|---|
| 0.191 | 43.16 | 43.16 | 43.16 | 43.16 |
| 0.230 | 40.27 | 40.27 | 40.27 | 35.45 |
| 0.275 | 36.95 | 36.96 | 36.95 | 30.88 |
| 0.325 | 33.20 | 33.20 | 33.20 | 29.48 |
| 0.363 | 30.55 | 30.55 | 30.55 | 27.44 |
| 0.388 | 29.00 | 29.00 | 29.00 | 24.74 |
| 0.413 | 27.45 | 27.45 | 27.44 | 22.05 |
| 0.438 | 25.89 | 25.90 | 25.89 | 19.36 |
| 0.459 | 24.84 | 24.84 | 24.79 | 17.61 |
| 0.475 | 24.27 | 24.27 | 24.12 | 16.80 |
| 0.492 | 23.71 | 23.71 | 23.46 | 15.99 |
| 0.509 | 23.14 | 23.14 | 22.79 | 15.19 |
| 0.525 | 22.58 | 22.58 | 22.13 | 14.38 |
| 0.542 | 22.01 | 22.01 | 21.46 | 13.56 |
| 0.557 | 21.55 | 21.18 | 20.63 | 12.96 |
| 0.569 | 21.22 | 20.10 | 19.65 | 12.58 |
| 0.582 | 20.89 | 19.02 | 18.72 | 12.15 |
| 0.594 | 20.56 | 17.94 | 17.84 | 11.66 |
| 0.607 | 20.23 | 17.23 | 17.23 | 11.21 |
| 0.619 | 19.90 | 16.90 | 16.90 | 10.80 |
| 0.632 | 19.57 | 16.57 | 16.52 | 10.41 |
| 0.644 | 19.24 | 16.24 | 16.09 | 10.05 |
| 0.657 | 18.91 | 15.91 | 15.61 | 9.70 |
| 0.669 | 18.58 | 15.58 | 15.08 | 9.35 |
| 0.682 | 18.25 | 15.25 | 14.59 | 8.97 |
| 0.694 | 17.92 | 14.92 | 14.13 | 8.57 |
| 0.707 | 17.59 | 14.59 | 13.59 | 8.23 |
| 0.719 | 17.26 | 14.26 | 12.96 | 7.95 |
| 0.731 | 16.93 | 13.93 | 12.35 | 7.72 |
| 0.744 | 16.60 | 13.60 | 11.77 | 7.54 |
| 0.756 | 16.26 | 13.27 | 11.23 | 7.14 |
| 0.769 | 15.93 | 12.93 | 10.72 | 6.52 |
| 0.781 | 15.60 | 12.60 | 10.30 | 6.10 |
| 0.794 | 15.27 | 12.27 | 9.97 | 5.88 |
| 0.806 | 14.94 | 11.69 | 9.54 | 5.62 |
| 0.819 | 14.61 | 10.86 | 9.01 | 5.31 |
| 0.831 | 14.28 | 10.03 | 8.55 | 4.54 |
| 0.844 | 13.95 | 9.20 | 8.17 | 3.31 |
| 0.856 | 13.62 | 8.37 | 7.64 | 2.40 |
| 0.869 | 13.29 | 7.54 | 6.96 | 1.81 |
| 0.881 | 12.96 | 6.71 | 5.98 | 0.80 |
| 0.894 | 12.63 | 5.88 | 4.70 | -0.61 |
| 0.906 | 12.30 | 5.80 | 4.17 | -1.62 |
| 0.919 | 11.97 | 6.47 | 4.39 | -2.24 |
| 0.931 | 11.64 | 7.14 | 4.66 | -1.87 |
| 0.944 | 11.31 | 7.81 | 4.98 | -0.53 |
| 0.956 | 10.98 | 8.48 | 5.48 | 2.01 |
| 0.969 | 10.65 | 9.15 | 6.15 | 5.73 |
| 0.981 | 10.33 | 9.78 | 6.78 | 8.54 |
| 0.992 | 10.04 | 10.37 | 7.37 | 10.46 |
| 1.000 | 9.84 | 10.79 | 7.79 | 11.82 |

TWIST DISTRIBUTIONS - TILTROTOR BLADES ($C_T/\sigma = 0.14$)    FIG. 18B

| r/R | BLADE 1 | BLADE 2 | BLADE 3 | BLADE 4 | BLADE 5 |
|---|---|---|---|---|---|
| 0.191 | 41.02 | 41.02 | 41.02 | 41.02 | 41.02 |
| 0.230 | 38.13 | 38.13 | 38.64 | 35.97 | 33.31 |
| 0.275 | 34.82 | 34.82 | 35.91 | 30.99 | 28.74 |
| 0.325 | 31.06 | 31.06 | 32.84 | 26.08 | 27.34 |
| 0.363 | 28.41 | 28.41 | 30.41 | 22.50 | 25.30 |
| 0.388 | 26.86 | 26.86 | 28.63 | 20.25 | 22.60 |
| 0.413 | 25.31 | 25.31 | 26.86 | 18.01 | 19.91 |
| 0.438 | 23.76 | 23.76 | 25.08 | 15.76 | 17.22 |
| 0.459 | 22.70 | 22.70 | 23.77 | 14.32 | 15.47 |
| 0.475 | 22.13 | 22.13 | 22.92 | 13.68 | 14.66 |
| 0.492 | 21.57 | 21.57 | 22.08 | 13.04 | 13.85 |
| 0.509 | 21.00 | 21.00 | 21.23 | 12.40 | 13.05 |
| 0.525 | 20.44 | 20.44 | 20.38 | 11.76 | 12.24 |
| 0.542 | 19.87 | 19.87 | 19.53 | 11.11 | 11.42 |
| 0.557 | 19.41 | 19.41 | 18.83 | 10.60 | 10.82 |
| 0.569 | 19.08 | 19.08 | 18.30 | 10.22 | 10.44 |
| 0.582 | 18.75 | 18.75 | 17.77 | 9.85 | 10.01 |
| 0.594 | 18.42 | 18.42 | 17.23 | 9.47 | 9.52 |
| 0.607 | 18.09 | 18.09 | 16.70 | 9.09 | 9.07 |
| 0.619 | 17.76 | 17.76 | 16.16 | 8.71 | 8.66 |
| 0.632 | 17.43 | 17.43 | 15.62 | 8.32 | 8.27 |
| 0.644 | 17.10 | 17.10 | 15.08 | 7.94 | 7.91 |
| 0.657 | 16.77 | 16.77 | 14.54 | 7.55 | 7.56 |
| 0.669 | 16.44 | 16.44 | 13.99 | 7.17 | 7.21 |
| 0.682 | 16.11 | 16.11 | 13.46 | 6.79 | 6.83 |
| 0.694 | 15.78 | 15.78 | 12.94 | 6.43 | 6.43 |
| 0.707 | 15.45 | 15.45 | 12.46 | 6.10 | 6.09 |
| 0.719 | 15.12 | 15.12 | 12.01 | 5.80 | 5.81 |
| 0.731 | 14.79 | 14.79 | 11.57 | 5.53 | 5.58 |
| 0.744 | 14.46 | 14.46 | 11.15 | 5.26 | 5.40 |
| 0.756 | 14.13 | 14.13 | 10.75 | 5.01 | 5.00 |
| 0.769 | 13.79 | 13.80 | 10.36 | 4.78 | 4.38 |
| 0.781 | 13.46 | 13.46 | 9.98 | 4.55 | 3.96 |
| 0.794 | 13.13 | 13.13 | 9.60 | 4.34 | 3.74 |
| 0.806 | 12.80 | 12.55 | 8.99 | 3.88 | 3.48 |
| 0.819 | 12.47 | 11.72 | 8.13 | 3.17 | 3.17 |
| 0.831 | 12.14 | 10.89 | 7.27 | 2.47 | 2.40 |
| 0.844 | 11.81 | 10.06 | 6.42 | 1.78 | 1.17 |
| 0.856 | 11.48 | 9.23 | 5.57 | 1.08 | 0.26 |
| 0.869 | 11.15 | 8.40 | 4.71 | 0.37 | -0.33 |
| 0.881 | 10.82 | 7.57 | 3.81 | -0.37 | -1.34 |
| 0.894 | 10.49 | 6.74 | 2.88 | -1.14 | -2.75 |
| 0.906 | 10.16 | 6.66 | 2.65 | -1.22 | -3.76 |
| 0.919 | 9.83 | 7.33 | 3.11 | -0.60 | -4.38 |
| 0.931 | 9.50 | 8.00 | 3.56 | 0.01 | -4.01 |
| 0.944 | 9.17 | 8.67 | 4.02 | 0.63 | -2.67 |
| 0.956 | 8.84 | 9.34 | 4.48 | 1.76 | -0.13 |
| 0.969 | 8.51 | 10.01 | 4.94 | 3.41 | 3.59 |
| 0.981 | 8.19 | 10.64 | 5.38 | 4.96 | 6.40 |
| 0.992 | 7.90 | 11.24 | 5.79 | 6.43 | 8.32 |
| 1.000 | 7.70 | 11.66 | 6.08 | 7.57 | 9.68 |

TWIST DISTRIBUTIONS - TILTROLTOR BLADES ($C_T/\sigma = 0.18$) FIG. 18C

| r/R | BLADE 1 | BLADE 2 | BLADE 3 | BLADE 4 |
|---|---|---|---|---|
| 0.191 | 44.84 | 44.84 | 44.84 | 44.84 |
| 0.230 | 41.95 | 37.13 | 42.46 | 38.47 |
| 0.275 | 38.64 | 32.56 | 39.73 | 34.12 |
| 0.325 | 34.89 | 31.16 | 36.66 | 31.80 |
| 0.363 | 32.23 | 29.12 | 34.23 | 29.70 |
| 0.388 | 30.68 | 26.42 | 32.45 | 27.80 |
| 0.413 | 29.13 | 23.73 | 30.68 | 25.91 |
| 0.438 | 27.58 | 21.04 | 28.90 | 24.01 |
| 0.459 | 26.52 | 19.29 | 27.59 | 22.53 |
| 0.475 | 25.95 | 18.48 | 26.75 | 21.46 |
| 0.492 | 25.39 | 17.67 | 25.90 | 20.39 |
| 0.509 | 24.82 | 16.87 | 25.05 | 19.32 |
| 0.525 | 24.26 | 16.06 | 24.21 | 18.25 |
| 0.542 | 23.69 | 15.24 | 23.35 | 17.17 |
| 0.557 | 23.23 | 14.64 | 22.65 | 16.40 |
| 0.569 | 22.90 | 14.26 | 22.12 | 15.95 |
| 0.582 | 22.57 | 13.83 | 21.59 | 15.45 |
| 0.594 | 22.24 | 13.34 | 21.06 | 14.90 |
| 0.607 | 21.91 | 12.89 | 20.52 | 14.38 |
| 0.619 | 21.58 | 12.48 | 19.98 | 13.88 |
| 0.632 | 21.25 | 12.09 | 19.44 | 13.40 |
| 0.644 | 20.92 | 11.73 | 18.90 | 12.93 |
| 0.657 | 20.59 | 11.38 | 18.36 | 12.47 |
| 0.669 | 20.26 | 11.03 | 17.82 | 12.02 |
| 0.682 | 19.93 | 10.65 | 17.29 | 11.57 |
| 0.694 | 19.60 | 10.25 | 16.76 | 11.14 |
| 0.707 | 19.27 | 9.91 | 16.28 | 10.71 |
| 0.719 | 18.94 | 9.63 | 15.83 | 10.28 |
| 0.731 | 18.61 | 9.40 | 15.39 | 9.89 |
| 0.744 | 18.28 | 9.22 | 14.97 | 9.52 |
| 0.756 | 17.95 | 8.83 | 14.57 | 9.17 |
| 0.769 | 17.62 | 8.20 | 14.18 | 8.83 |
| 0.781 | 17.29 | 7.78 | 13.80 | 8.57 |
| 0.794 | 16.96 | 7.57 | 13.43 | 8.38 |
| 0.806 | 16.62 | 7.30 | 12.81 | 8.46 |
| 0.819 | 16.29 | 6.99 | 11.95 | 8.81 |
| 0.831 | 15.96 | 6.22 | 11.09 | 8.51 |
| 0.844 | 15.63 | 4.99 | 10.24 | 7.56 |
| 0.856 | 15.30 | 4.08 | 9.39 | 6.14 |
| 0.869 | 14.97 | 3.49 | 8.53 | 4.25 |
| 0.881 | 14.64 | 2.48 | 7.63 | 2.32 |
| 0.894 | 14.31 | 1.07 | 6.70 | 0.36 |
| 0.906 | 13.98 | 0.06 | 6.47 | -0.08 |
| 0.919 | 13.65 | -0.56 | 6.93 | 1.00 |
| 0.931 | 13.32 | -0.19 | 7.39 | 2.44 |
| 0.944 | 12.99 | 1.16 | 7.85 | 4.24 |
| 0.956 | 12.66 | 3.69 | 8.31 | 6.56 |
| 0.969 | 12.33 | 7.41 | 8.76 | 9.40 |
| 0.981 | 12.02 | 10.23 | 9.20 | 11.85 |
| 0.992 | 11.72 | 12.14 | 9.61 | 13.91 |
| 1.000 | 11.51 | 13.49 | 9.90 | 14.85 |

US 6,497,385 B1

ROTOR BLADE WITH OPTIMIZED TWIST DISTRIBUTION

CROSS-REFERENCE TO RELATED APPLICATIONS

This application claims the benefit of U.S. provisional application No. 60/246,576, filed Nov. 8, 2000, and of U.S. provisional application No. 60/246,577, filed Nov. 8, 2000.

BACKGROUND OF THE INVENTION

1. Field of the Invention

The present invention relates to a rotor blade for a rotary-wing aircraft, and more particularly, to such a blade with an increased hover figure of merit as compared to known blades.

2. Description of Related Art

Hover efficiency is a crucial determining factor in rotor blade performance, strongly influencing both range and payload of a rotary wing aircraft such as a helicopter or tiltrotor aircraft.

Although rotor performance in hover is greatly influenced by the very complex and unsteady vortical wake generated beneath the rotor, much of the current methodology for rotor blade aerodynamic design is based on momentum and blade element theories that do not account for the effect of this vortical wake. Classical vortex theory has also been applied to this problem, but by necessity it requires the use of simplifying assumptions such as prescribing the position of the vortex wake, which limits the extent to which it improves over momentum theory for design applications.

Classical methods are reasonably accurate in predicting rotor hover performance. However, even a very small increase in hover efficiency can provide important improvements in rotary wing aircraft payload and range. Classical methods are not capable of calculating performance to the required level of accuracy to predict these small increases in hover efficiency.

A typical rotary wing helicopter H is depicted in FIG. 1. It includes a fuselage FH to which is mounted landing gear LH, a main rotor RH and a tail rotor TH. The helicopter H has one or more powerplants PH to provide motive force to the main rotor RH and the tail rotor TH. The main rotor RH includes a plurality of rotor blades BH, with which the present invention is concerned, mounted to a rotor hub HH. It will be appreciated by those skilled in the art that the helicopter can have a different number of blades depending on the performance parameters it must satisfy.

U.S. Pat. No. 3,882,105, U.S. Pat. No. 5,035,577 and U.S. Pat. No. 6,000,911 are examples of prior art attempts to provide optimized rotor blades for such a helicopter. These patents focus on numerous geometrical properties of the blade, including twist. Blade geometric twist θ determines a blade's geometric angle of attack at each spanwise location relative to the airflow approaching the blade, and thus the lift generated by the blade as it rotates. (By convention, positive values of θ signify upward twist of the blade leading edge.) These patents state that increasing overall blade twist beyond that of previous configurations reduces the geometric angle of attack and the local lift near the blade tip in hover. This is said to diminish the strength of the vortex trailed from the tip of the blade as it rotates and thereby reduce vortex interference and induced power losses and increase aerodynamic efficiency.

Those skilled in the art understand that a given blade's figure of merit $F_M$ is a generally accepted indication of a rotor's hover efficiency. Figure of merit is defined as the ratio of minimum possible power required to hover, to the actual power required to hover. Thus, figure of merit compares the actual rotor performance with the performance of an ideal rotor. Johnson, W., *Helicopter Theory*, Princeton Univ. Press (1980), pages 34–35 (hereinafter "Johnson").

Mathematically, figure of merit can be expressed as follows:

$$F_M = 0.7071 \frac{C_T^{1.5}}{C_Q}$$

where $$\text{Rotor torque coefficient } C_Q = \frac{Q}{\rho \pi R^3} (\Omega R)^2$$

$$\text{Rotor thrust coefficient } C_T = \frac{T}{\rho \pi R^2} (\Omega R)^2$$

In the above equations:
Q=torque in pounds-feet,
T=thrust in pounds,
R=rotor radius in feet measured from the axis of rotation,
Ω=rotor angular velocity in radians per second, and
ρ=density of air in slugs per cubic feet.

It will be appreciated that $F_M$ for a particular rotor is an indication of the ratio of the induced power required to produce a given amount of thrust if the air were uniformly accelerated through the rotor disc around the azimuth, to the actual total power (induced plus profile) required to produce the same amount of thrust with the actual rotor. Induced power is a consequence of the fact that the lifting force induced by the rotating blades is not directly vertical, and therefore has a component producing what is known to those skilled in the art as induced drag. Profile power is a consequence of the profile drag on the rotating blades.

U.S. Pat. No. 3,882,105 proposes changing the geometric twist of a conventional rotor blade near the tip. Geometric twist is the angle of a blade chord relative to a reference plane. The patent superimposes a span-wise twist distribution on an otherwise conventional rotor blade in a tip region of the blade (in the patent, outward to the blade tip from 71% to 88% of the blade span, depending on the number of blades in the rotor). The nomimal twist distribution disclosed in the patent provides a tip region with an ever-decreasing amount of incremental twist relative to the twist of the conventional blade, as shown in FIG. 2 of the patent.

U.S. Pat. No. 3,882,105 also suggests that the blade at an even smaller region closer to the tip (outward to the tip from 80% to 96% of the blade span, again depending on the number of blades in the rotor) can be twisted in the opposite direction to increase blade twist. The patent specifically states that this relatively upward twist close to the tip is no greater than a maximum of 3.5°, and should never exceed an amount that maximizes lift-to-drag ratio in this region.

The only helicopter known actually to use a blade with upward twist in a tip region is Sikorsky's UH-60. The UH-60 blade has a tip region in which the twist angle decreases incrementally beginning at about 85% of the blade span. The region from about 93% to the tip has an increasing twist angle (that is, the blade twists back upward) about 2° or so. The UH-60 blade is discussed in Johnson, W. R., "Wake Model for Helicopter Rotors in High Speed Flight," NASA CR 177507, November 1988, p. 260. It appears that the UH-60 blade's twist distribution is intended to follow the teachings of U.S. Pat. No. 3,882,105.

There is also prior art that suggests that sweeping the blade tip backward and drooping the blade tip downward (providing an anhedral angle) will further improve hover efficiency.

Classic momentum theory suggests that in hover mode the optimum twist angle distribution along the blade span is proportional to 1/r, where r is the location along the blade measured from the axis of rotation. However, using such a twist distribution in the inboard regions of the blade (that is, from approximately r/R=0.20 to r/R=0.75), increases vibration in forward flight. Accordingly, twist in that region of helicopter rotor blades is usually reduced to below that which is called for by classical momentum theory, resulting in a concomitant performance penalty.

In summary, even though helicopter blade performance has been improved over the years by approaches such as that disclosed in the above-mentioned patents and other prior art, rotor blade designers continue to seek further performance enhancements for the hover, forward flight and landing regimes of helicopters.

Those efforts are hampered by the complexity of the flow created by helicopter rotors and the difficulty in analyzing those flows. But as difficult as it is to optimize a particular helicopter rotor blade configuration, tiltrotor aircraft provide an even greater challenge to the blade designer.

This type of aircraft has rotary blades that enable it to take-off as a helicopter, and are then tilted to provide forward propulsive thrust in a mode of flight in which the aircraft operates as a propeller-driven airplane. An example of such an aircraft extant today is the Bell-Boeing V-22 Osprey.

FIG. 2 depicts a typical tiltrotor aircraft T. It has a fuselage FT with a fixed wing W and an empennage assembly E. At each end of the wing W there is mounted a powerplant PT, and each powerplant has associated with it a rotor RT. The rotors each include a number of blades BT, typically three in tiltrotor aircraft now being designed, mounted to a rotor hub HT. When taking off and landing the powerplant-rotor assemblies are in the position shown in FIG. 2. Sufficient thrust is created by the rotor blades to support the aircraft, which thus takes off and lands as would a helicopter. It then transitions to forward flight by gaining sufficient speed to cause the wing W to create enough thrust to support the aircraft, while rotating the powerplant-rotor assemblies by roughly 90°. At that point, the rotor blades function as propeller blades and provide sufficient thrust to propel the tiltrotor forward in the same manner as a conventional fixed-wing aircraft.

The dual use of the same rotor blades for both lifting the tiltrotor aircraft as a helicopter and for propelling it forward as a fixed-wing aircraft necessitates a compromise in blade configuration between one that is optimal for hover (helicopter mode) and one that is optimal for cruise (airplane mode).

Tiltrotor blade performance is quantified by the blade's figure of merit $F_M$ in the hover mode (as discussed above) and its propulsive efficiency q in cruise mode (where $\eta=1.0$ represents an ideal maximum). Optimum performance is obtained by increasing these parameters as much as possible. Figure of merit determines the rotorcraft payload capacity. Roughly speaking, an increase in figure of merit of 0.01 could result in more than a 5% increase in payload. Increasing either figure of merit or propulsive efficiency would increase the aircraft's range. An increase of 0.01 in figure of merit could result in a 4% increase in range. One reason for this is that an increased figure of merit enables the aircraft to take off with more fuel. An increase of 0.01 in propulsive efficiency could result in a 1% increase in range. These rough numbers illustrate that figure of merit is the strongest consideration in maximizing tiltrotor aircraft performance.

In an attempt to optimize these parameters, the current V-22 blade incorporates a twist angle function such that the change in geometric twist ($\Delta\theta$) decreases linearly about 20° from the blade root (r/R=0) up to an r/R of about 0.45, and then decreases linearly by about 15° from there to the blade tip. Providing a steeper twist angle gradient in the inner region is thought to optimize propulsive efficiency, while a shallower slope in the outer region is intended to optimize the figure of merit in hover mode.

It would be desirable particularly to increase the blade's figure of merit considering the benefits to be gained in overall aircraft performance by doing so.

SUMMARY OF THE INVENTION

It is an object of the present invention to provide a rotor blade that results in improved performance as compared to prior art blades.

In accordance with one aspect of the invention, a rotor blade includes a blade root for attachment to a rotor hub for rotating the blade about an axis of rotation transverse to a blade span R between the axis of rotation and a distal end of the blade defining a blade tip, wherein the blade has a chord extending between a blade leading edge and a blade trailing edge transverse to the blade span and the chord has a local geometric twist angle $\theta=f(r/R)$, with r being the distance along the blade span from the axis of rotation, the blade comprising:

an inner region between an inner boundary at $(r/R)_{inner}=0.20\pm0.04$ and a transition point at $(r/R)_{trans}=0.75\pm0.04$, wherein $\theta_{inner}$ at $(r/R)_{inner}$ has a positive value and $\theta_{inner}$ is greater than or equal to $\theta_{trans}$ at $(r/R)_{trans}$; and a tip region between the transition point and the blade tip, the tip region including:

a first portion between $(r/R)_{trans}$ and $(r/R)_{min}>(r/R)_{trans}$, wherein $\theta$ continuously decreases from $\theta_{trans}$ to $\theta_{min}$ at $(r/R)_{min}$, and $\Delta\theta_{tip1}=|\theta_{min}-\theta_{trans}|>3°$, and a second portion between $(r/R)_{min}$ and the blade tip, wherein $\theta$ continuously increases from $\theta_{min}$ to $\theta_{tip}$ at the blade tip, and $\Delta\theta_{tip2}=|\theta_{tip}-\theta_{min}|$ is at least about 3° and no greater than about 20°.

The amount of uptwist at the tip ($\Delta\theta_{tip2}$) is generally chosen to be as large as possible considering the structural properties of the particular blade under consideration. It is not chosen to maximize lift-to-drag ratio in this region of the blade.

An important embodiment of this aspect of the invention is a rotor blade for a tiltrotor aircraft, in which $(r/R)_{min}=0.91\pm0.04$, $\Delta\theta_{tip1}=7.50\pm2.5°$, and $\Delta\theta_{tip2}=10°\pm6°$. Preferably, in such a rotor blade $\Delta\theta_{inner}=|\theta_{inner}-\theta_{trans}|=32.5°\pm7.5°$ and $\theta$ continuously decreases from $(r/R)_{inner}$ to $(r/R)_{trans}$.

Another specific embodiment of the invention is a rotor blade for a helicopter in which $(r/R)_{min}=0.94\pm0.04$, $\Delta\theta_{tip1}=5°\pm2°$, and $\Delta\theta_{tip2}$ is from about 3° to about 10°. Preferably in such a rotor, $\Delta\theta_{inner}=\theta_{inner}-\theta_{trans}|=20°\pm5°$ and $\theta$ continuously decreases from $(r/R)_{inner}$ to $(r/R)_{trans}$.

In accordance with another aspect of the invention, a rotor blade for a helicopter capable of hover and forward flight includes a blade root for attachment to a rotor hub for rotating the blade about an axis of rotation transverse to a blade span R between the axis of rotation and a distal end of the blade defining a blade tip, wherein the blade has a chord extending between a blade leading edge and a blade trailing edge transverse to the blade span and the chord has a local geometric twist angle $\theta = f(r/R)$, with r being the distance along the blade span from the axis of rotation, the blade comprising:

an inner region between an inner boundary at $(r/R)_{inner} = 0.20 \pm 0.04$ and a transition point at $(r/R)_{trans} = 0.75 \pm 0.04$, wherein $\theta_{inner}$ at $(r/R)_{inner}$ has a positive value and $\theta_{inner}$ is greater than or equal to $\theta_{trans}$ at $(r/R)_{trans}$;

a mechanism for selectively providing along the blade span within the inner region at least two twist angle distributions while the helicopter is in flight, a first twist angle distribution for hover and a second twist angle distribution for forward flight, wherein $\Delta\theta_{inner} = |\theta_{inner} - \theta_{trans}|$ for the first twist angle distribution is greater than $\Delta\theta_{inner2} = |\theta_{inner} - \theta_{trans}|$ for the second twist angle distribution; and a tip region extending from the transition point to the blade tip, the tip region including:
a first portion between $(r/R)_{trans}$ and $(r/R)_{min} > (r/R)_{trans}$, wherein $\theta$ continuously decreases from $\theta_{trans}$ to $\theta_{min}$ at $(r/R)_{min}$, and $\Delta\theta_{tip1} = |\theta_{min} - \theta_{trans}| > 3°$, and
a second portion between $(r/R)_{min}$ and the blade tip, wherein $\theta$ continuously increases from $\theta_{min}$ to $\theta_{tip}$ at the blade tip, and $\Delta\theta_{tip2} = |\theta_{tip} - \theta_{min}|$ is at least about 3° and no greater than about 20°.

In a more specific embodiment of this aspect of the invention, $\Delta\theta_{inner1} = 20° \pm 5°$, $\Delta\theta_{inner2} = 5° \pm 2°$, $(r/R)_{min} = 0.94 \pm 0.04$, and $\Delta\theta_{tip2}$ is from about 3° to about 10°. In addition, the mechanism can comprise a plurality of selectively actuatable trailing edge flaps disposed along the blade.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

FIG. 4 is a cross-section taken along lines 4—4 of

FIG. 3, also showing notations used in describing the present invention.

FIG. 7 is a tabulation of the data points for r/R>0.20 plotted in FIG. 6.

FIG. 18A is a tabulation of the twist distributions for the first family of tiltrotor blades.

FIG. 18B is a tabulation of the twist distributions for the second family of tiltrotor blades.

FIG. 18C is a tabulation of the twist distributions for the third family of tiltrotor blades.

DETAILED DESCRIPTION OF THE PREFERRED EMBODIMENTS

Figure 1:
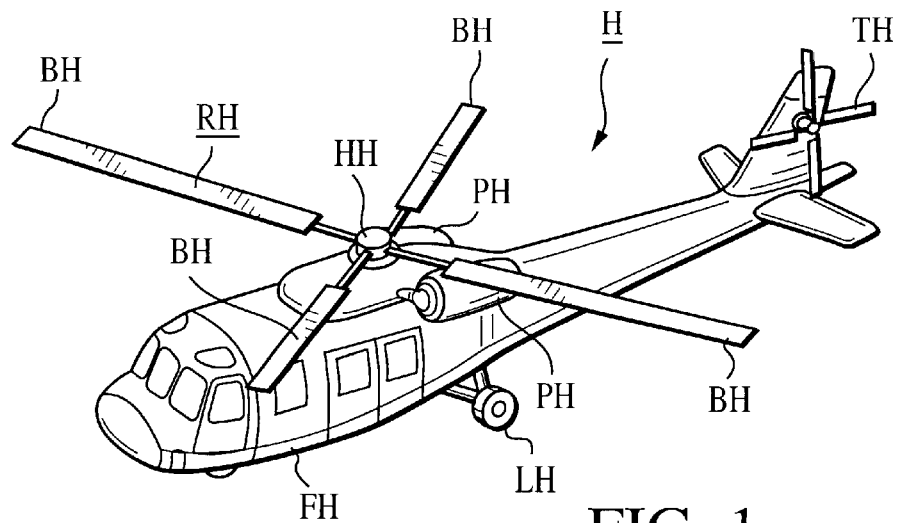
FIG. 1 depicts a conventional helicopter.
Figure 2:
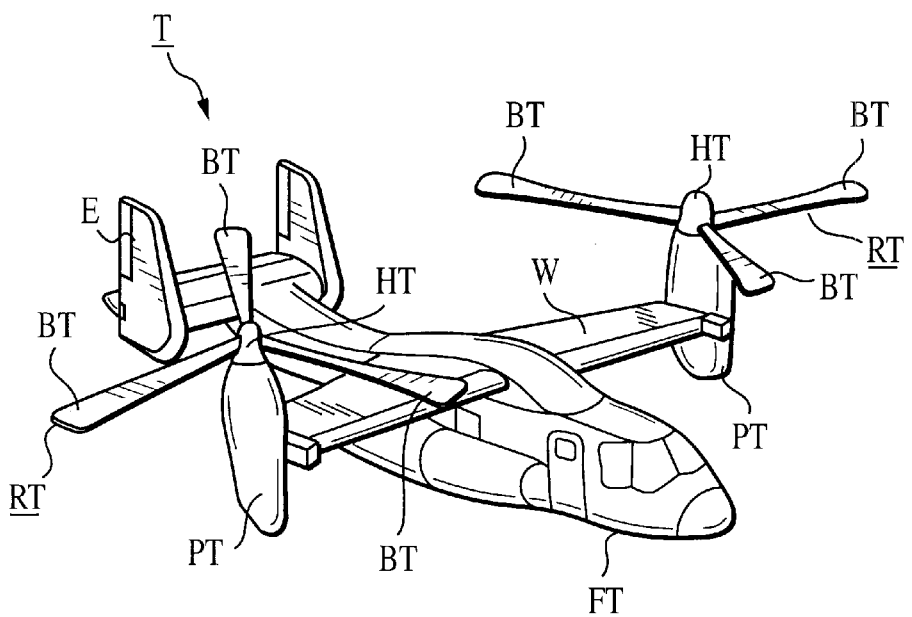
FIG. 2 depicts a conventional tiltrotor aircraft.
Figure 3:
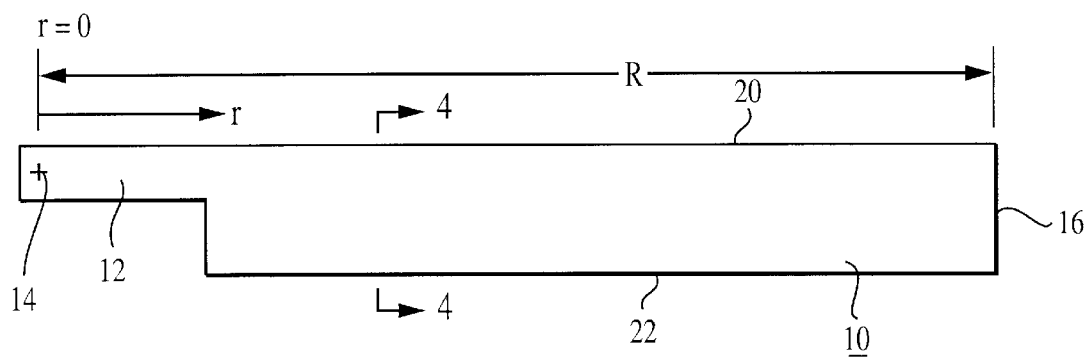
FIG. 3 shows a schematic planform of a rotor blade showing the notations used in describing the present invention.

FIG. 3 is a schematic planform of a rotor blade 10 of the type that may incorporate the present invention. The blade 10 includes a blade root 12 that is adapted to be mounted to the rotor hub of a helicopter like that in FIG. 1 or the rotor hub of a tiltrotor aircraft like that FIG. 2. The blade is rotated by the rotor hub about an axis of rotation 14. The blade 10 terminates at its distal end at a blade tip 16. The distance between the axis of rotation 14 and the blade tip 16 is the blade span R. The distance r is measured along the blade from the axis of rotation 14 toward the blade tip 16.

Figure 4:
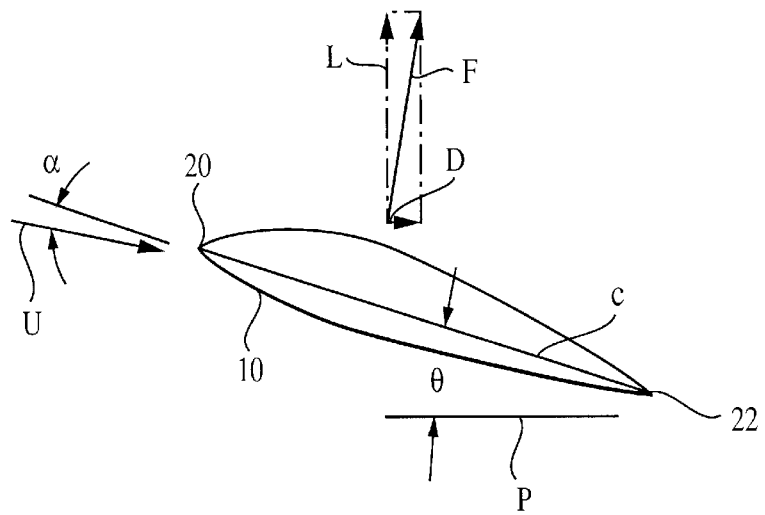

FIG. 4 shows a typical cross-section of the blade 10. The blade has an airfoil-shaped cross-section with a leading edge 20 and a trailing edge 22. The blade chord c is the distance transverse to the blade span between the blade leading edge 20 and trailing edge 22. The blade's angle of attack $\alpha$ is the angle between the chord c and the velocity U of the airflow approaching the blade. The airfoil has a characteristic lift coefficient $C_L$ that typically depends on the local angle of attack $\alpha$; that is, $C_L = C_L(\alpha)$. The airfoil generates a force F per unit of blade span $= C_L(\alpha)\rho U^2/2$. The force F normal to the velocity vector U is not necessarily vertical. It can be resolved into a vertical lifting component L perpendicular to the plane of rotation P and an induced drag component D. The blade is also subject to profile drag caused by pressure losses as air flows over the blade.

The geometric blade twist θ as used herein is a geometric property of the blade. It is the angle the blade chord c forms with the blade's plane of rotation P. The twist θ is a function of the distance from the axis of rotation; in other words, the blade chord c has a local geometric twist angle $\theta = f(r/R)$. It will be appreciated that the local aerodynamic angle of attack α depends on the local twist angle θ, but the twist angle is independent of the direction of the velocity vector. Typically, the twist angle includes some "built-in" constant $\theta_0$, which represents the angle at which the blade is mounted to the rotor hub. In addition, it should be clear that the present discussion uses the term "geometric blade twist" and the symbol "θ" to refer to the blade twist angle when the blade is at rest. Those skilled in the art will appreciate that the twist distribution (that is, $f(r/R)$) will change slightly due to aerodynamic loading when the blade is in use. That change does not affect the principles underlying the present invention.

Optimum hover efficiency of a rotor can be obtained by minimizing the power required to turn the rotor to provide a given thrust (the vertical lift component L integrated over the rotor disc area). This power consists of induced power and profile power. The former is associated with the blade lift (as a component of the force F shown in FIG. 4), and the latter is associated with the blade drag. Classical theory states that minimum induced power is achieved when uniform downwash velocity exists through the rotor disc. For an infinite number of blades, this can be shown to correspond to a constant circulation (Γ) along the blade planform where circulation is a quantity related to the local lift per unit length along the blade through the expression $$l = \rho U \Gamma$$

where U is the local chordwise velocity in feet per second.

Sectional lift, and thus the circulation along the blade planform, can be varied by controlling the twist distribution $\theta = f(r/R)$. Obtaining the proper circulation distribution is of primary importance in minimizing induced power. The optimum circulation distribution will differ from classical theory due to the finite number of blades and the fact that the rotor vortex wake rolls up into discrete tip vortices trailing from near the tip of each blade yielding a flow field far different from classical momentum theory. This departure is accentuated for tiltrotors which must operate at high blade loadings (ratio of thrust to total blade area) in order to operate as both helicopter rotors and airplane propellers. For this reason, the optimum circulation and twist can be significantly different from that predicted by classical methods. Varying the local twist angle in accordance with the present invention will provide an optimum circulation distribution that takes into account these non-classical effects. An important aspect of the proposed twist distribution and the circulation distribution, and the resulting velocity field, is that the tip vortex is pushed physically away from the rotor, as illustrated in FIG. 5.

Figure 5A:
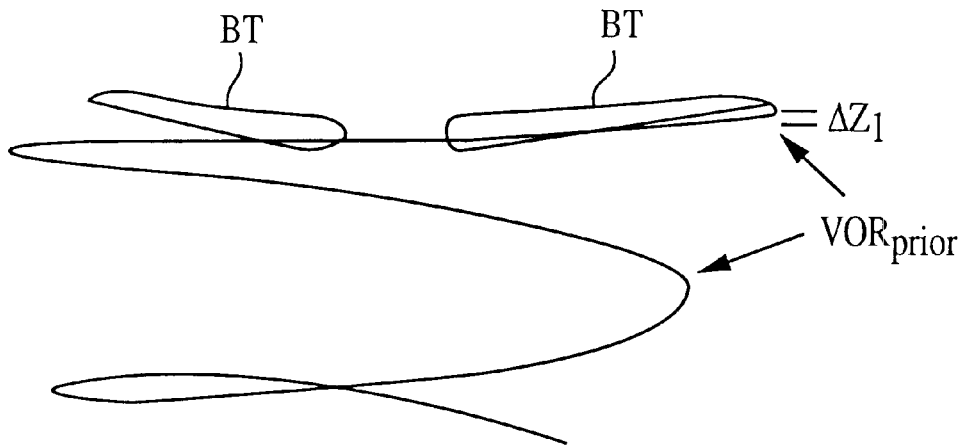
FIG. 5 comprises FIG. 5A, which schematically illustrates the position of a vortex shed from a prior art rotor blade tip, and FIG. 5B, which schematically illustrates the position of a vortex trailed from the tip of a rotor blade in accordance with the invention.
Figure 5B:
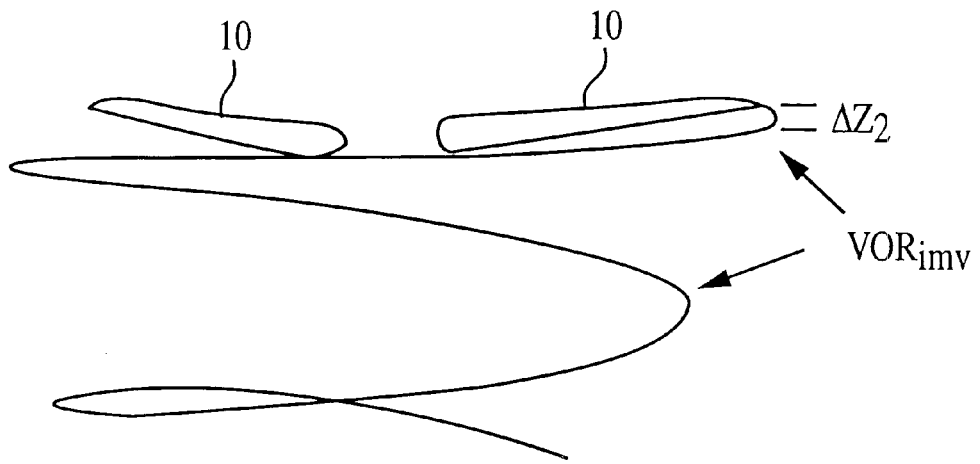

The vortex patterns shown in FIGS. 5A and 5B were generated by a computer program developed by the assignee of the present invention to solve numerically the equations governing the optimization of rotor blades in hover flight. FIG. 5A illustrates the vortex pattern generated by the current V-22 rotor. The rotor blades are depicted schematically in the figures in accordance with the equations used by the program to represent the rotor. The tip vortex $VOR_{prior}$ trailed by the rotating rotor blades BT is spaced from the blade tips a distance of Δz1. However, when the principles underlying the present invention are applied to optimize the rotor's figure of merit $F_M$, the tip vortex $VOR_{inv}$, trailed by the rotating rotor blades 10 is spaced from the blade tips a distance Δz2>Δz1.

It has been found that the twist distribution $\theta = f(r/R)$ must account for both the discrete nature of this vortical wake and the effects of profile power in adjusting the blade circulation to achieve minimum total power. The computer code used to validate the physics governing the invention has proven to provide very good correlation with average performance measurements over a wide variety of planforms and operating conditions, as cited in the relevant literature. See, for example, Davis, S. J., et al., "Aerodynamic Design Optimization of a Variable Diameter Tilt Rotor," *American Helicopter Society* 51st *Annual Forum*, Fort Worth, Tex., May 1995, pages 101–111, Tung, C., et al., "Evaluation of Hover Performance Codes," *American Helicopter Society* 50th *Annual Forum*, Washington, D.C., May 1994, pages 829–844, Felker, F. F., "Accuracy of Tilt Rotor Hover Performance Predictions," TM-104023, June 1993, Quackenbush, T. R., "Rotor Design Optimization Using a Free Wake Analysis," *NASA CR* 177612, April 1993, and Shanley, J. P., "Systematic Correlation and Evaluation of the EHPIC Hover Analysis," *American Helicopter Society* 46th *Annual Forum*, Washington, D.C., May 1990, pages 1121–1134.

The present invention can be incorporated into a rotor blade of any sort, whether for a helicopter or a tiltrotor aircraft, which blade includes a blade root for attachment to a rotor hub for rotating said blade about an axis of rotation transverse to a blade span R between the axis of rotation and a distal end of the blade defining a blade tip, and which blade has a chord extending between a blade leading edge and a blade trailing edge transverse to the blade span, with the chord having a local geometric twist angle $\theta = f(r/R)$, with r being the distance along the blade span from the axis of rotation.

In accordance with the invention, the blade comprises:

(a) an inner region between an inner boundary at $(r/R)_{inner} = 0.20 \pm 0.04$ and a transition point at $(r/R)_{trans} = 0.75 \pm 0.04$, wherein $\theta_{inner}$ at $(r/R)_{inner}$ has a positive value and $\theta_{inner}$ is greater than or equal to $\theta_{trans}$ at $(r/R)_{trans}$, and (b) a tip region between the transition point and the blade tip, the tip region including:

(i) a first portion between $(r/R)_{trans}$ and $(r/R)_{min} > (r/R)_{trans}$, wherein θ continuously decreases from $\theta_{trans}$ to a minimum twist angle $\theta_{min}$ at $(r/R)_{min}$, and $\Delta\theta_{tip1} = |\theta_{min} - \theta_{trans}| > 3°$, and (ii) a second portion between $(r/R)_{min}$ and said blade tip, wherein θ continuously increases from $\theta_{min}$ to $\theta_{tip}$ at said blade tip, and $\Delta\theta_{tip2} = |\theta_{tip} - \theta_{min}|$ is at least about 3° and no greater than about 20°.

FIGS. 6–9 illustrate embodiments of the invention applicable to helicopter blades.

One family of optimal helicopter rotor blades comprise embodiments of the invention for two- to seven-bladed helicopter rotors based on the flight condition in Table 1 below.

TABLE 1

| NUMBER OF BLADES = | 2, 3, 4, 5 and 7 |
|---|---|
| RADIUS (R) = | 20 ft. |
| OMEGA (Ω) = | 36.24 rad./sec. |
| CHORD (c) = | 1.25 ft. |
| PRE-CONE = | 2° |
| TIP MACH NUMBER ($M_{TIP}$) = | 0.65 |
| $C_T/\sigma$ = | 0.08 |

In Table 1, "Pre-Cone" refers to the built-in coning angle, which is a pre-determined upward flapping angle measured from the plane of rotation at the blade root; $(M_{TIP})=\Omega R/a$, where a=speed of sound in feet per second; σ=thrust-based rotor solidity (non-dimensional).

A preferred further embodiment uses constant chord, NACA 0012 airfoil sections along the full span of the blade. Those skilled in the art will appreciate that the aerodynamic principles underlying the invention will be valid for other airfoil sections or if the blade planform is tapered at the tip.

Figure 6:
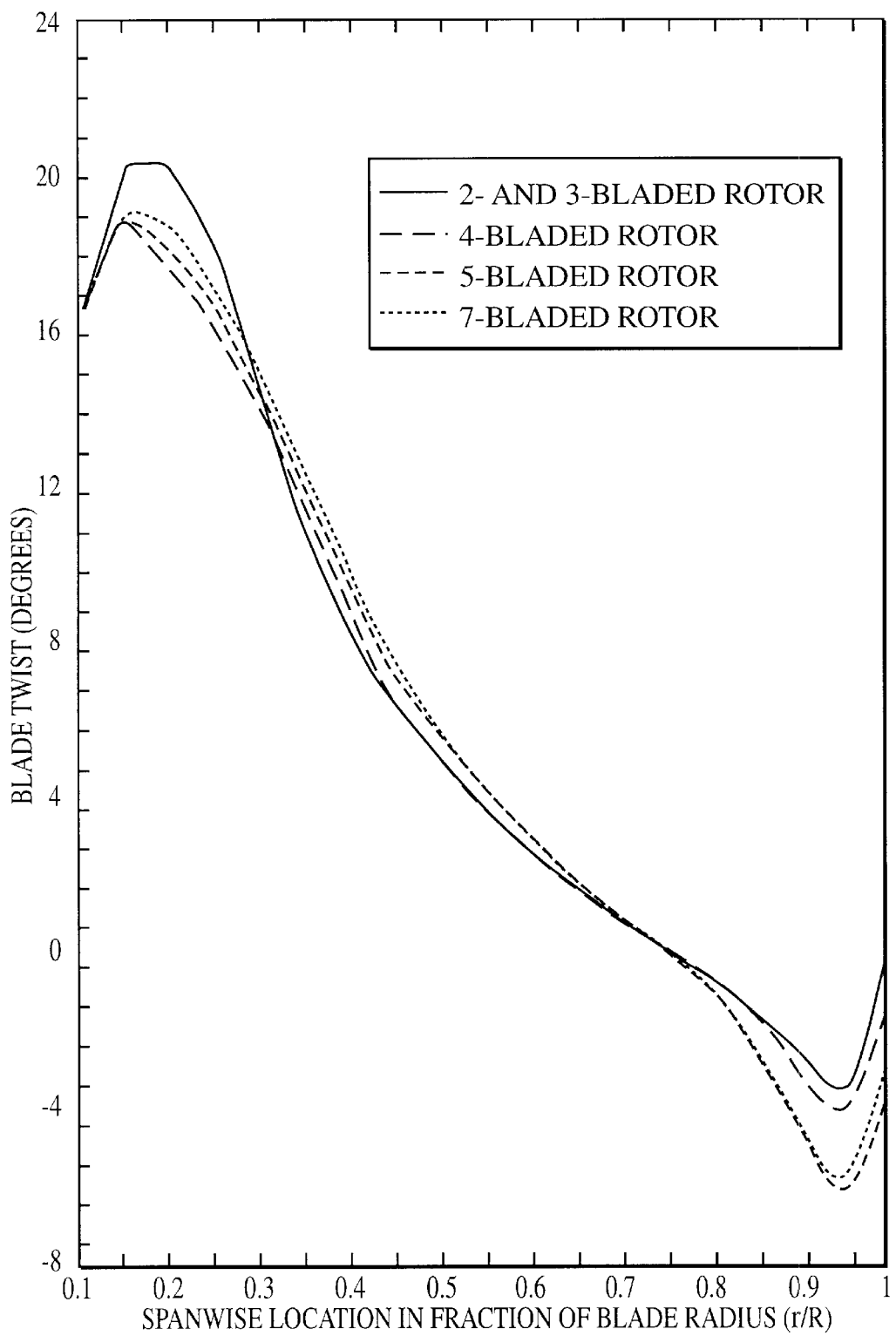
FIG. 6 is a graph that plots the optimal twist distributions for the blades of a family of two- to seven-blade helicopter rotors in accordance with the present invention.

FIG. 6 illustrates the optimal twist distributions for blades in this family of helicopter rotors. FIG. 7 tabulates the data points plotted in FIG. 6 for r/R >0.20. It will be appreciated that FIG. 6 plots the data points in FIG. 7 according to the convention whereby θ=0 is placed at r/R=0.75. That is, FIG. 6 plots θ as if the reference plane P (see FIG. 4) coincided with the chord c at r/R=0.75. This is a common convention used by those skilled in this art. Thus, a linear transposition involving an appropriate constant relates the tabulated values in FIG. 7 to the plotted values in FIG. 6.

In accordance with the invention, FIG. 6 illustrates and FIG. 7 tabulates examples of rotor blades for a helicopter, that is, blades in which the blade root is adapted to be attached to a rotor hub of a helicopter, wherein $(r/R)_{min}$= 0.94±0.04, $\Delta\theta_{tip1}$=5°±2°, and $\Delta\theta_{tip2}$ is from about 3° to about. In accordance with another more specific aspect of the invention, FIGS. 6 and 7 exemplify such blades in which the inner region has a twist distribution wherein $\Delta\theta_{inner}$= $|\theta_{inner}-\theta_{trans}|$=20°±5° and θ continuously decreases from $(r/R)_{inner}$ to $(r/R)_{trans}$. FIG. 7 tabulates five different functions ƒ(r/R), each representing a different twist distribution. It will be appreciated that the values tabulated in FIG. 7 are approximate and that the operative consideration from the standpoint of the present invention is that the difference between any two values θ at $(r/R)_n$ and $(r/R)_{n+1}$ is substantially in accordance with that in any one of the tabulated functions.

Figure 8A:
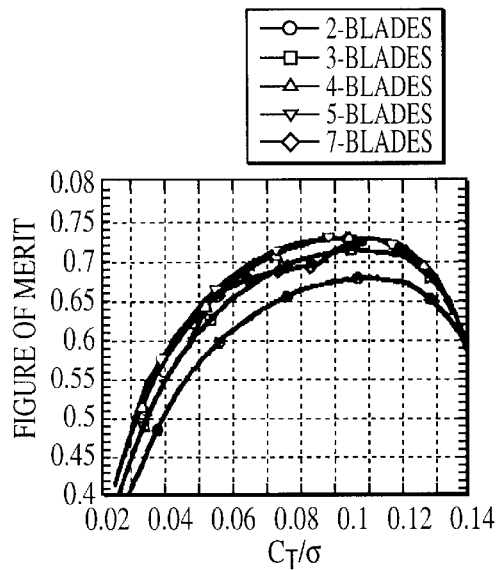
FIG. 8 comprises FIG. 8A, which plots $F_M$ versus $C_T/\sigma$ for a family of prior art helicopter blades, and FIG. 8B, which plots $F_M$ versus $C_T/\sigma$ for a family of helicopter blades in accordance with the present invention.
Figure 8B:
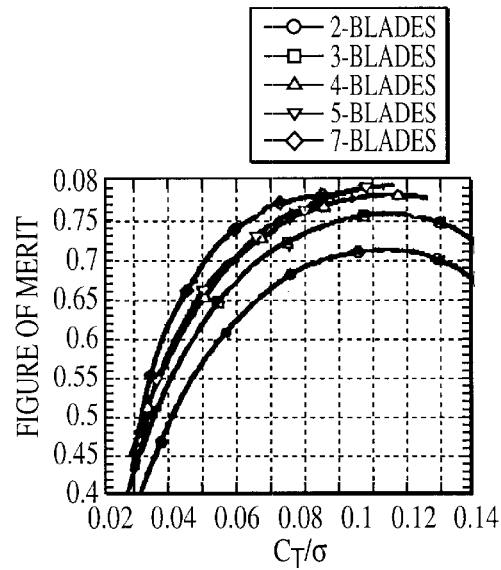
Figure 9:
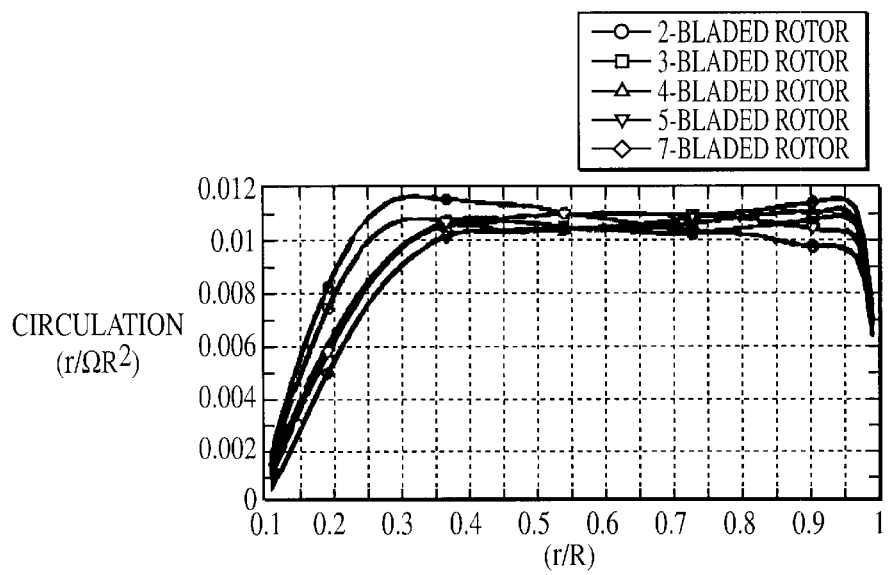
FIG. 9 is a graph that plots circulation distributions for a family of helicopter rotor blades in accordance with the present invention.

The increase in hover efficiency of the optimal blades over current rotor blades is illustrated in FIGS. 8A and 8B, which compare computer predictions of hover figure of merit between prior art blades, using −10° linear twist from root to tip (FIG. 8A), and optimal blades according to the present invention (FIG. 8B). The circulation distributions for these blades are shown in FIG. 9. Note that the circulation distribution for each blade is nearly constant throughout almost the entire operative portion of the blade span.

It should be understood that the blade optimization routine in accordance with the present invention does not seek to maximize lift-to-drag ratio in an outer tip region of the blade, as in certain prior art approaches discussed earlier. In fact, the principles underlying the invention suggest that an optimal blade will incorporate as much twist increase as is structurally possible in the outermost portion of the tip region without causing the blade to stall. Typically, that will yield a lift-to-drag ratio in this region that is less than the maximum achievable.

Turning now to the application of the invention to tiltrotor aircraft, the following discusses exemplary embodiments of three different V-22 rotor blade families, optimized according to the present invention.

The families of rotor blades described below will provide nearly optimal performance for operating conditions in the vicinity of three different flight conditions.

TABLE 2

| HOVER | CRUISE |
|---|---|
| 3 BLADES | |
| RADIUS = 19 ft | |
| SOLIDITY (σ) (thrust basis) = .105, (geometric basis) = .1138 | |
| PRE-CONE = 2.75° | |
| OMEGA (Ω) = 43.15 rad/sec | OMEGA (Ω) = 34.84 rad/sec |
| TIP MACH NO. ($M_{TIP}$) = 0.72 | TIP MACH NO. ($M_{TIP}$) = 0.58 |
| THRUST (T) = 27,400 lbf/rotor | THRUST (T) = 3514 lbf/rotor |
| $C_T$ = 0.017 | $C_T$ = 0.0035 |
| FORWARD SPEED = 0 knots | FORWARD SPEED = 275 knots |

Figure 10:
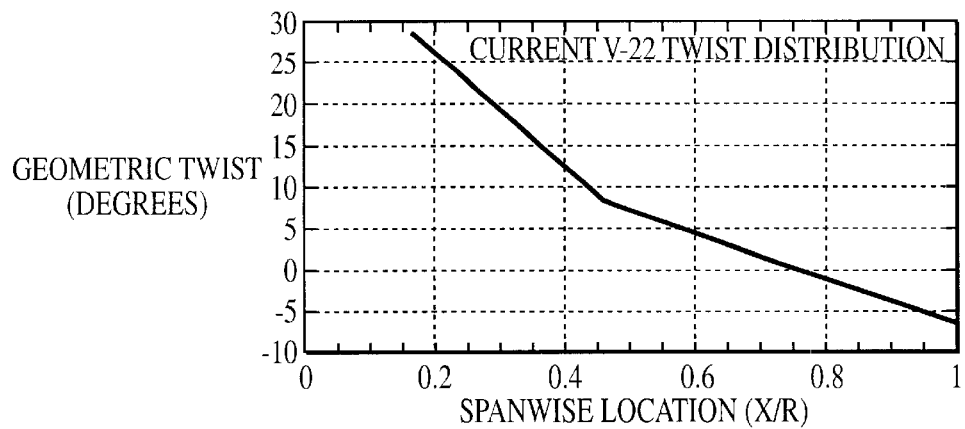
FIG. 10 is a graph that plots the geometric twist versus r/R for a current V-22 rotor blade.
Figure 11:
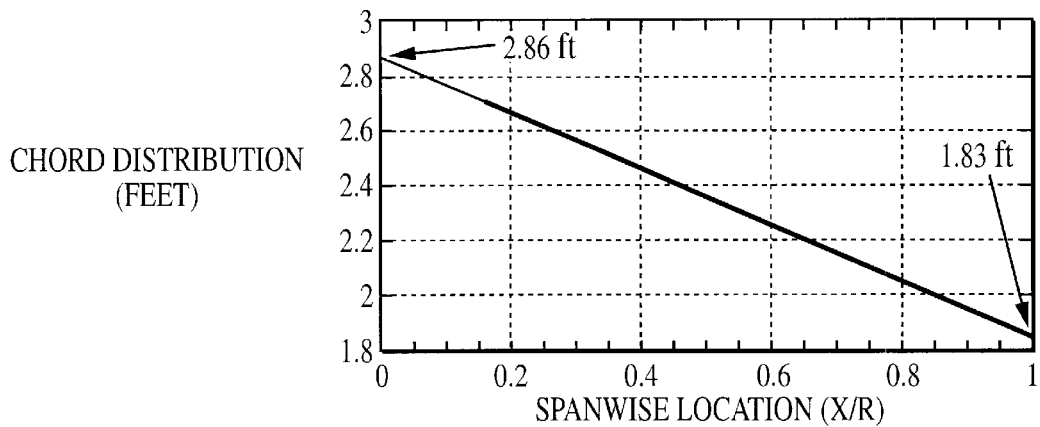
FIG. 11 is a graph that plots the chord distribution versus r/R for a current V-22 rotor blade.
Figure 12:
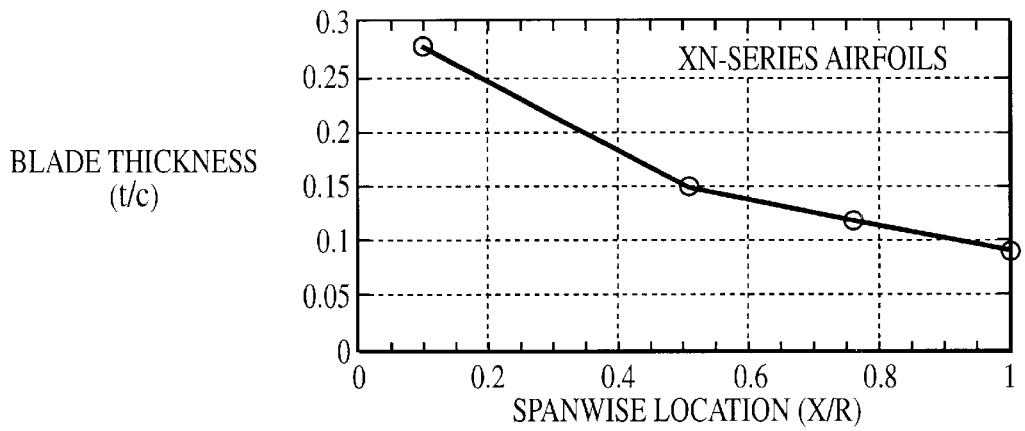
FIG. 12 is a graph that plots blade thickness versus r/R for a current V-22 rotor blade.

For all of the preferred embodiments discussed below, these characteristics are used, as well as those depicted in FIGS. 10–12. Geometric twist is varied to obtain optimal blades in accordance with the invention.

The first family of blades uses a current target design point of the current V-220 sprey tiltrotor blade, namely 27,400 pounds of thrust per rotor in hover ($C_T$=0.017) and 3514 pounds of thrust per rotor when cruising at 275 knots. In this embodiment, hover mode $C_T/\sigma$=0.16.

Blade 1: Current V-22. $F_M$=0.719, η=0.836.

This blade is included in the study to provide a baseline performance against which to measure the invention.

Blade 2: Simply Modified V-22. $F_M$=0.750, η=0.869.

Figure 13:
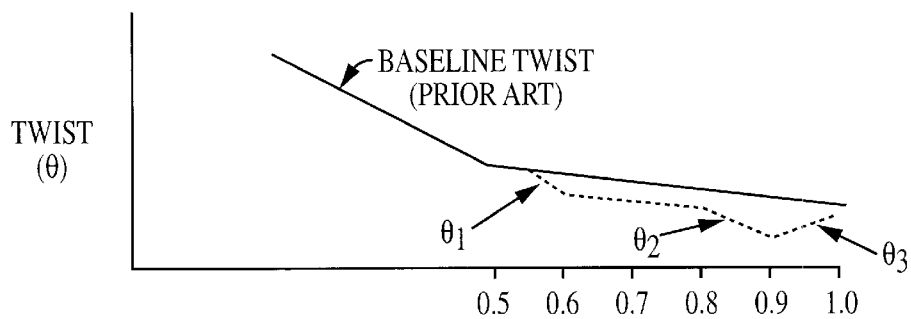
FIG. 13 is a graph that plots the twist distribution of a standard V-22 rotor blade modified in a simplified manner in accordance with principles underlying the present invention.

This design provides a performance increase for the V-22 with a minimal modification to the current blade. The modification is performed by applying the following twist changes to the current V-22 blade based on the definitions of θn in FIG. 13.

θ$_1$=−3° from r/R=0.55 to 0.6

θ$_2$=−4° from r/R=0.8 to 0.9

θ$_3$=8° from r/R=0.9 to 1.0

Blade 3: Optimum Propulsive Efficiency Design. $F_M$=0.750, η=0.876.

Blade 4: Optimum Overall Design. $F_M$=0.769, η=0.856.

Figure 14:
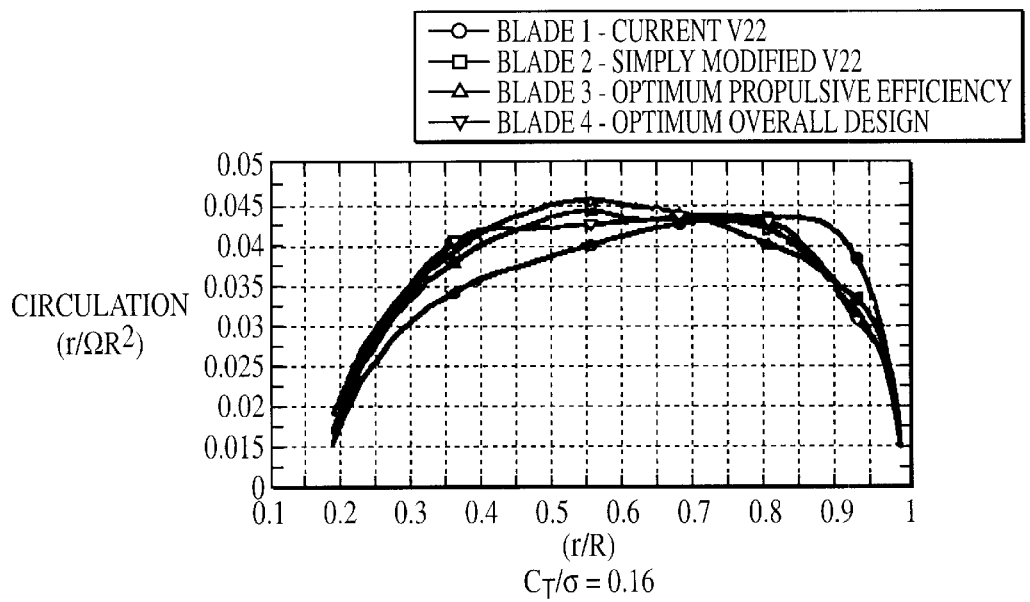
FIG. 14 is a graph that plots circulation distributions for a first family of tiltrotor blades illustrating the effect of the present invention.

The circulation distributions in hover mode for each of these designs are shown in FIG. 14. The blade circulation distributions were obtained by modifying the baseline V-22 blade geometric twist.

It is important to note that if it is structurally possible to increase the uptwist near the blade tip even further than in these examples (though not so much as to induce blade stall), it will provide an even greater increase in the figure of merit, as discussed above in connection with the application of the invention to helicopter rotor blades.

It is also possible to increase figure of merit about 0.01 with a 10° anhedral (droop) applied outboard of R/r=0.75. However, this also decreases propulsive efficiency by about 0.05. Thus, if this droop could be applied with an in-flight active control during hover, the further increase in figure of merit (which translates to a more than 5% increase in payload) could be obtained, although the droop would have to at least partially be taken out in cruise flight to maintain aircraft range. As shown in FIG. 5, part of the improved performance in hover is due to the fact that the twist distribution provides some effective tip droop, moving the tip vortex further from the rotor rotation plane.

An alternate embodiment of the invention for the current V-22 Osprey optimized the current V-22 blade for a design point at 23,370 pounds of thrust per rotor in hover ($C_T$=

0.0145) and 3514 pounds of thrust per rotor in cruise ($C_T$=0.0035). For this embodiment, hover mode $C_T/\sigma$=0.14.

The family of blades described herein will provide high performance for a range of operating conditions in the vicinity of this flight condition. Except for the hover thrust level, the rotor characteristics and nominal flight condition are identical to those previously described for the above blade with $C_T$=0.017.

Blade 1: Current V-22. $F_M$=0.759, $\eta$=0.836.

This blade is included for the reasons discussed above in connection with the first exemplary embodiments of tiltrotor blades in accordance with the invention.

Blade 2: Simply Modified V-22. $F_M$=0.773, $\eta$=0.846.

This design provides a performance increase for the V-22 with a minimal modification to the current blade. The modification is performed by applying the following twist changes to the current V-22 blade based on the definitions in FIG. 13. $\Theta_2$=−4° from r/R=0.8 to 0.9 $\Theta_3$=8° from r/R=0.9 to 1.0

Blade 3: Optimum Propulsive Efficiency Design. $F_M$=0.764, $\eta$=0.876.

Blade 4: Compromise High Performance Design. $F_M$=0.785, $\eta$=0.847.

Blade 5: Optimum overall design. $F_M$=0.790, $\eta$=0.856.

Figure 15:
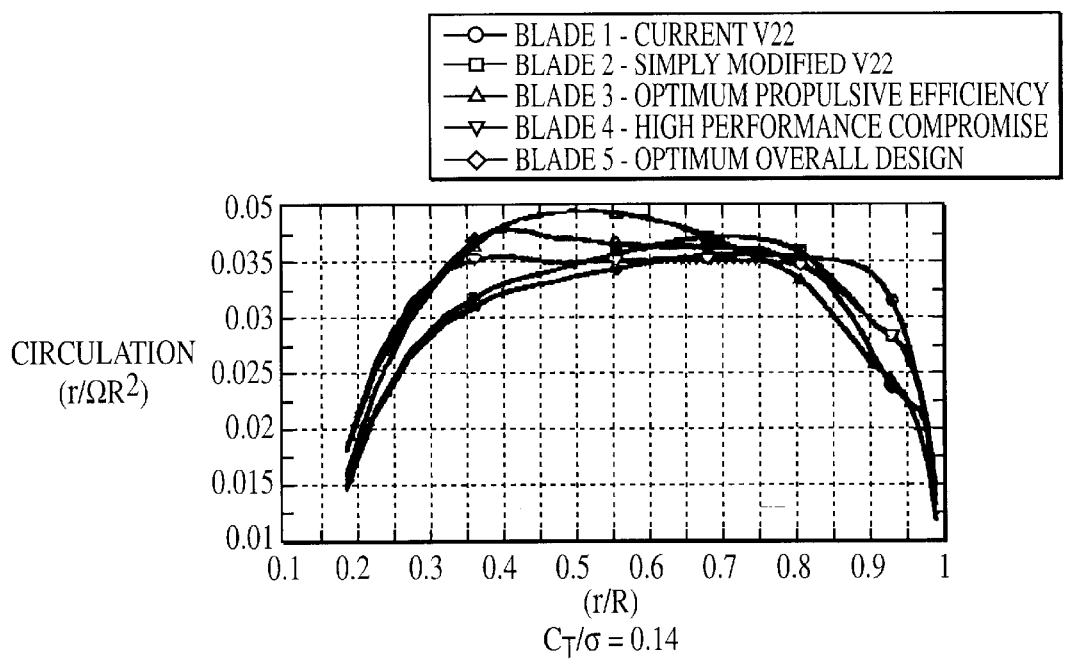
FIG. 15 is a graph that plots circulation distributions for a second family of tiltrotor blades illustrating the effect of the present invention.

The circulation distributions in hover mode for each of these blades are shown in FIG. 15. The blade circulation distributions were obtained by modifying the baseline V-22 blade geometric twist. Ideally, an active control system that allows in-flight adjustment from Blade 3 in cruise to Blade 5 in hover is desirable as it will allow an increased propulsive efficiency of 0.02 over the optimal fixed design, Blade 5. The Blade 5 twist distribution is identical to that at $C_T$=0.017 (with a fixed offset to provide higher thrust). Blade 4 is a compromise high performance design that provides a large increase in figure of merit without undue change from the current V-22 blade.

Yet another alternate embodiment of the invention for the current V-22 Osprey optimized the current V-22 blade for a design point at 30,624 pounds of thrust per rotor in hover ($C_T$=0.019) and 3514 pounds of thrust per rotor in cruise ($C_T$=0.0035). For this embodiment, hover mode $C_T/\sigma$=0.18.

The family of blades described will provide high performance for a range of operating conditions in the vicinity of this flight condition. Except for the hover thrust level, the rotor characteristics and nominal flight condition are identical to those previously described for the blade above with $C_T$=0.019.

Blade 1: Current V-22. $F_M$=0.690, $\eta$=0.836.

This blade is included for the reasons discussed above in connection with the other exemplary embodiments of tiltrotor blades in accordance with the invention discussed above.

Blade 2: Blade Twist from $C_T$=0.017 Configuration. $F_M$=0.733, $\eta$=0.856.

Blade 3: Optimum Cruise Efficiency Design. $F_M$=0.721, $\eta$=0.876.

Blade 4: Optimum Overall Design. $F_M$=0.740, $\eta$=0.856.

Figure 16:
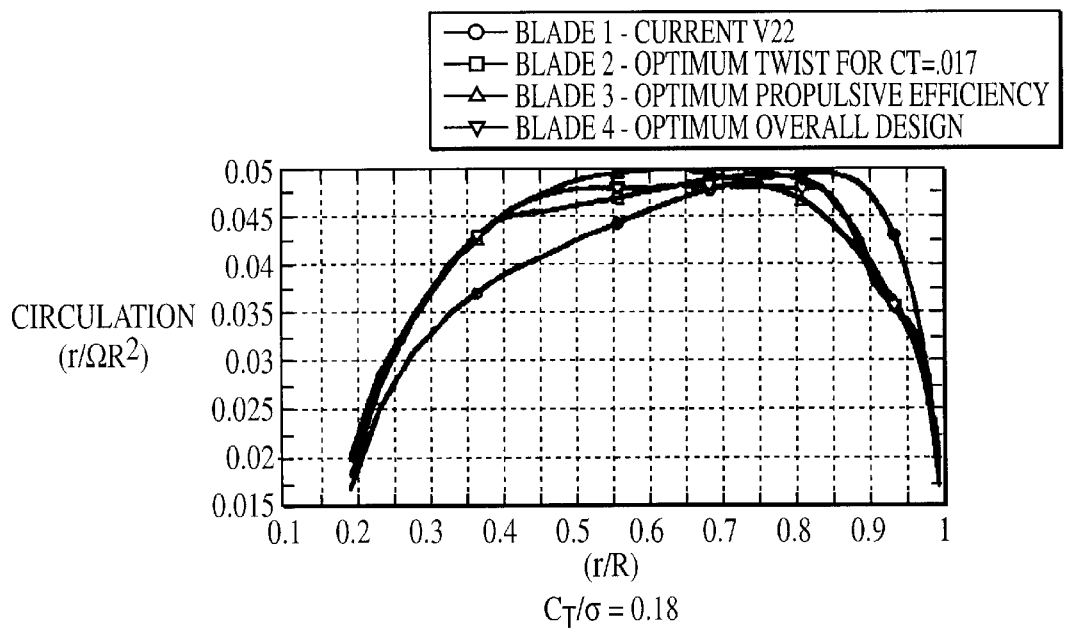
FIG. 16 is a graph that plots circulation distributions for a third family of tiltrotor blades illustrating the effect of the present invention.

The circulation distributions in hover mode for each of these blades are shown in FIG. 16. For the preferred embodiment, the blade circulation distributions were obtained by modifying the baseline V-22 blade geometric twist.

Figure 17:
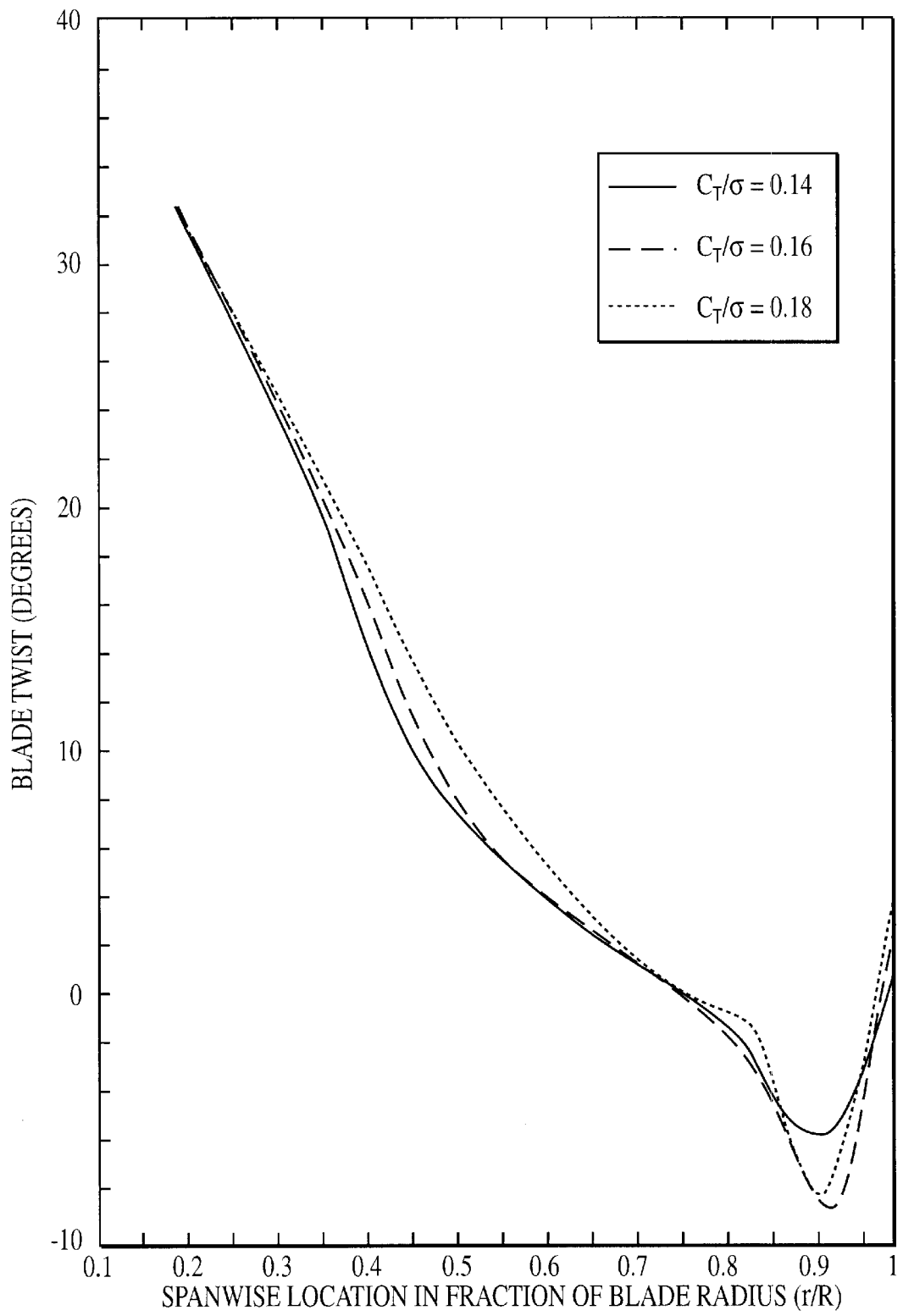
FIG. 17 is a graph that plots optimal twist distributions for a three-blade rotor at three different design points of a tiltrotor aircraft, as determined in accordance with the present invention.

FIG. 17 plots the twist distribution of each Blade 4 discussed above. FIGS. 18A–18C tabulate the twist distribution data calculated for all of the above tiltrotor blades.

It will be appreciated that FIG. 17 plots the data points in FIGS. 18A–18C according to the convention whereby $\theta$=0 is placed at r/R=0.75. This is the same convention used in the plot of FIG. 6.

In accordance with the invention, FIG. 17 illustrates and FIGS. 18A–18C tabulate examples of rotor blades for a tiltrotor, that is, blades in which the blade root is adapted to be attached to a rotor hub of a tiltrotor aircraft, wherein $(r/R)_{min}$=0.91±0.04, $\Delta\theta_{tip1}$=7.5°±2.5°, and $\Delta\theta_{tip2}$=10°±6°. In accordance with another more specific aspect of the invention, FIGS. 17 and 18 exemplify such blades in which the inner region has a twist distribution wherein $\Delta\theta_{inner}$=|−$\theta_{inner}$−$\theta_{trans}$=32.5°±7.5° and $\theta$ continuously decreases from $(r/R)_{inner}$ to $(r/R)_{trans}$. As with FIG. 7, FIGS. 18A–18C tabulate different functions $f(r/R)$, each representing a different twist distribution. It will be appreciated that the values tabulated in FIGS. 18A–18C are approximate and that the operative consideration from the standpoint of the present invention is that the difference between any two values $\theta$ at $(r/R)_n$ and $(r/R)_{n+1}$ is substantially in accordance with that in any one of the tabulated functions.

In accordance with still another aspect of the invention, a helicopter rotor blade is provided with an optimized geometric twist angle distribution $\theta = f(r/R)$ for both hover and forward flight regimes.

There are mechanisms that will allow the aerodynamic characteristics of a rotor blade to be adjusted in flight. Examples of such mechanisms are the shape-memory alloy actuated trailing edge flaps disclosed in U.S. Pat. No. 5,752,672 and U.S. Pat. No. 6,220,550, both of which are incorporated by reference herein as if set out in full.

Figure 19:
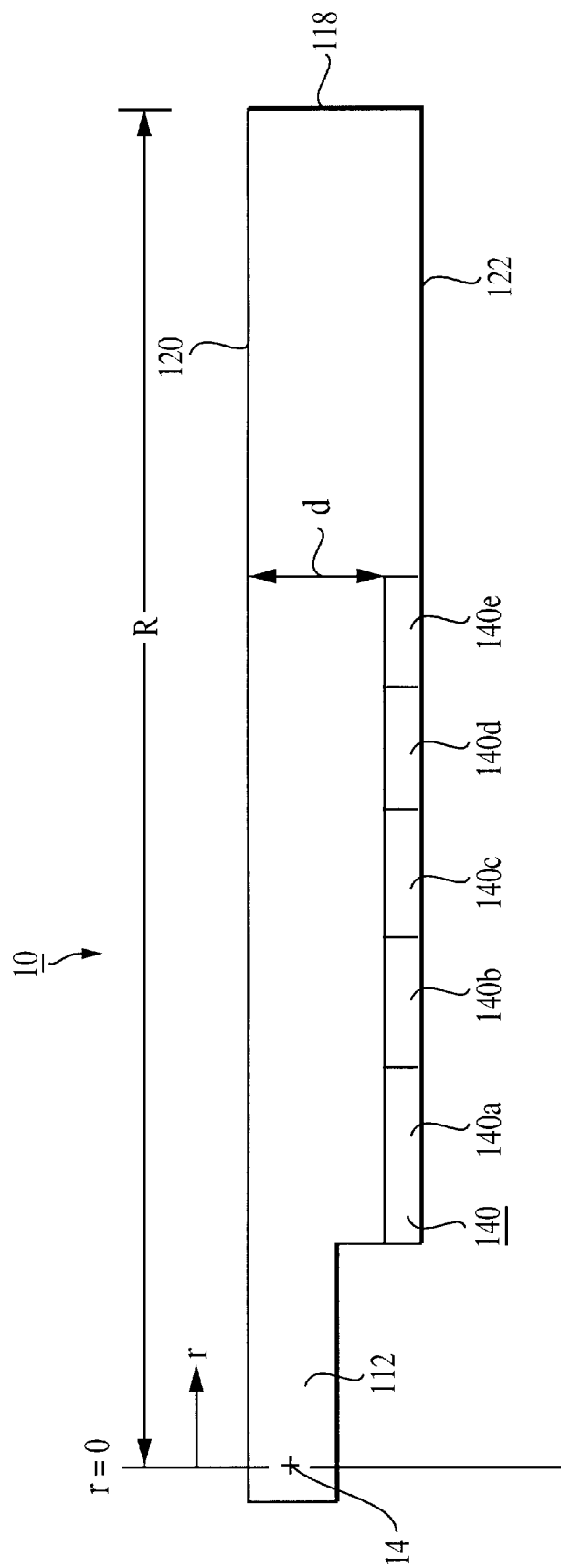
FIG. 19 is a schematic planform of a helicopter rotor blade incorporating a mechanism for changing the blade's lift distribution in flight.

FIG. 19 illustrates the use of such flaps with a helicopter rotor blade 110 similar to the blade 10 discussed above. In FIG. 19 elements having counterparts in the blade 10 shown in FIG. 3 are referenced by like numerals with a "100"-series designation.

Referring to FIG. 19, a helicopter rotor blade is constructed in conventional fashion, and includes a leading edge 120 and a trailing edge 122. The blade is attached to a rotor hub as described above, so that when the rotor hub is rotationally driven (or, alternatively, when it is permitted to autorotate), the rotor blade 110 will rotate about the axis of rotation 114. The blade also has a tip end 116 and a mechanism 140 comprising a series of five schematically illustrated trailing edge flaps, 140a, 140b, 140c, 140d and 140e. Of course, any number of segments may be utilized and flaps need not be adjacent to one another depending upon the control characteristics desired. In the preferred embodiment, the series of flaps 140a–140e are operated using shape memory alloy (SMA) actuators, as discussed in the above-mentioned patents, but any conventional actuating means known in the art may also be employed, whether mechanical, electrical, pneumatic or hydraulic. The actuators may be driven either manually or automatically using flight control software. The control arrangements disclosed U.S. Pat. No. 5,752,672 can be used to actuate the flaps in accordance with a desired actuation schedule.

In the preferred embodiment, each flap 140a–140e has the same chord dimension along its length. Preferably, the flaps 140a–140e are positioned in the inboard 50%–70% of the rotor blade span, (that is, from r/R≈0.20 to 0.50–0.70) and their chord width constitutes approximately 25%–35% of the blade chord c. Thus, as illustrated in FIG. 19, the distance d between the leading edge 120 of the blade 110 and the effective flap hinge-points is approximately 0.65c to 0.75c. The flaps preferably can rotate through an angle of at least +25°.

Figure 20:
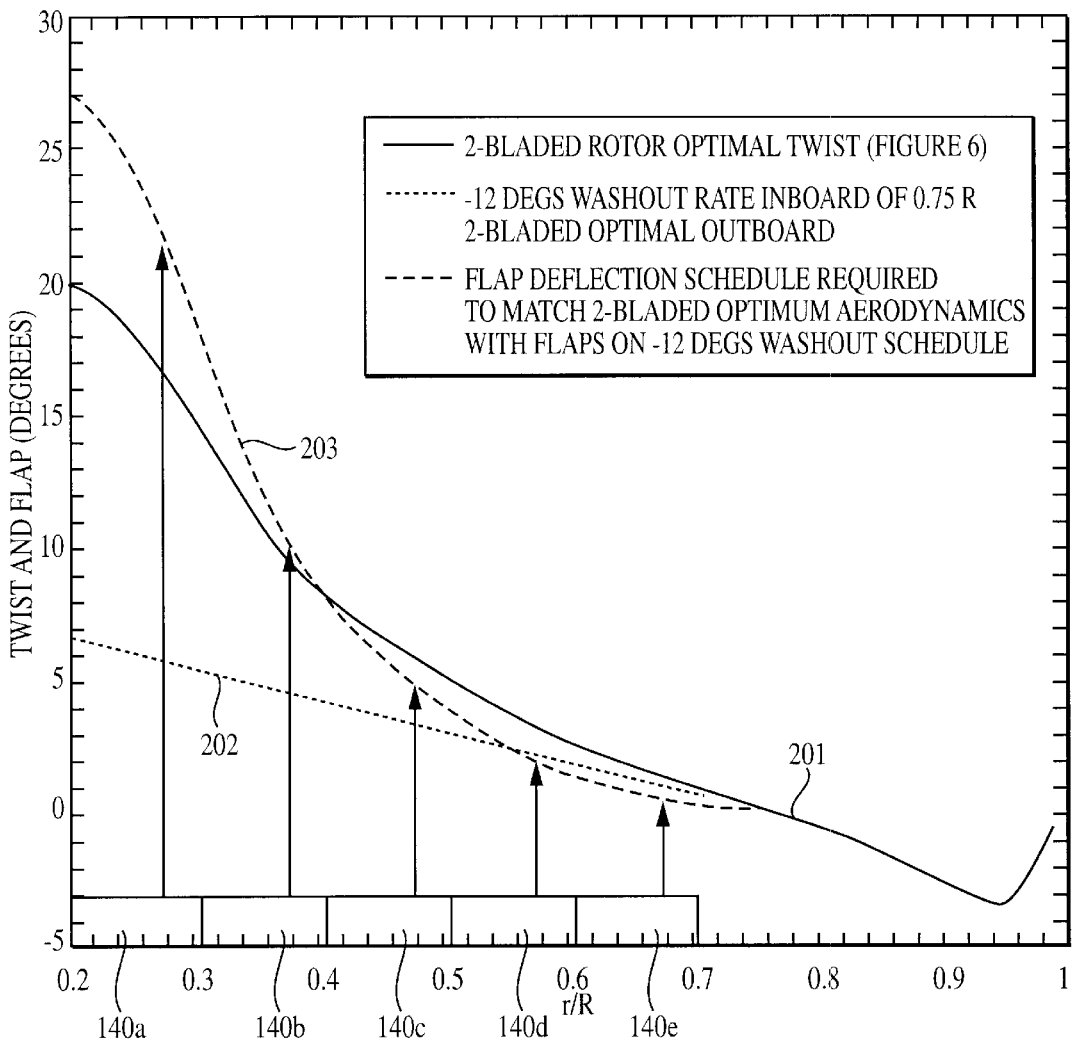
FIG. 20 illustrates an example of how the mechanism shown in FIG. 19 can be deployed to optimize performance of a helicopter in its hover and forward-flight modes of operation.

FIG. 20 illustrates one manner of operating a flap mechanism such as that shown in FIG. 19. FIG. 20 illustrates an embodiment with five trailing edge flaps, each of which extends along 10% of the blade span R, so that the flaps occupy from r/R=0.20 to r/R=0.70.

It is known that increasing twist in the inboard regions of a helicopter rotor blade improves hover performance. However, large twist values in this region also increase vibration in high-speed forward flight. The aspect of the present invention represented by FIGS. 19 and 20 circumvents this difficulty by enabling optimal performance to be obtained in both hover and high-speed forward flight through a scheduled in-flight deployment and retraction of lift-enhancing devices, in this case trailing edge flaps 140a–140e. The flaps are deflected downward for the hover flight mode to provide a lift (circulation) distribution that closely approximates that obtained with the optimal twist distributions in accordance with the discussion above in connection with FIGS. 5–9. The flaps are retracted in forward flight to improve performance in that mode and avoid vibration.

A preferred embodiment of the technique is illustrated in FIG. 20. Line 201 in FIG. 20 represents an optimal twist distribution calculated in accordance with the present invention. This is the twist distribution from the two-bladed rotor plotted in FIG. 6 and tabulated in FIG. 7. The light dotted line 202 in FIG. 20 represents a twist distribution appropriate for forward flight. The geometric twist decreases linearly over the range $0.2 < r/R < 0.75$ at a rate of $-12°/R$. This would be considered the normal or baseline location of the flaps 140a–140e. Outboard of $r/R=0.75$ the forward flight and hover twist distributions are identical.

The heavy dotted line 203 in FIG. 20 depicts the deflections required to be applied to the flaps 140a–140e to obtain approximately the same circulation distribution as that produced by the optimum hover twist distribution (the line 201), if the deflection could be varied continuously along the span of each flap. This flap deflection schedule assumes that 1° in downward flap deflection provides the same increment in lift as ½ in increased twist. However, the five discrete flaps 140a–140e are in fact constrained to a single deflection angle per flap. The five arrows in FIG. 20 identify the appropriate values on the line 203 to which each flap is deflected from its baseline position in forward flight. As indicated by the position of the arrows, this is the flap's deflection angle at a location 75% along the span of each flap measured from its inboard edge.

The use of a mechanism of this type for changing the inboard lift or circulation distribution of a rotor blade in-flight enables the blade to realize all the performance advantages taught by the present invention. As a further advantage, not only does this capability increase rotor efficiency, but it also provides a method for reducing the noise produced by the rotor blades.

As shown in FIG. 5, one consequence of the invention is to move the tip vortex further below the blade. This tip vortex is responsible for so-called blade-vortex interaction (BVI) noise, which occurs as a trailing blade interacts with the vortex trailed by a leading blade. By displacing the tip vortex further away from the leading blade, BVI noise is reduced. Although there would be some BVI noise reduction simply by employing a tip twist profile in accordance with the invention, employing a mechanism that can optimize the circulation distribution along the entire blade will reduce BVI noise even further. This reduction in BVI noise will be achieved both in hover and low-speed forward flight when descending during approach for landing with the inboard flaps deflected downward to provide the hover-optimum circulation distribution.

Those skilled in the art will readily recognize how to calculate an exact flap deflection schedule that will result in aerodynamic circulation and lift properties that closely match those obtained with the optimal twist distributions described herein. That is, determining the proper deflection for each flap required to change the blade twist angle will involve a simple, straightforward calculation once the geometries of the flaps and blade and the desired $\theta = f(r/R)$ are known.

Those skilled in the art will recognize that the depicted mechanism involving trailing edge flaps represents only one example of a manner for altering the lift distribution along a rotor blade in the prescribed manner. Alternate systems could include one or more of (a) trailing edge flaps, (b) leading edge flaps, (c) variable twist devices, (d) variable camber devices and/or (e) spoilers. More generally, this aspect of the invention can be realized using any mechanism that can be activated in-flight to alter the lift distribution of a rotor blade.

A computer program that those skilled in the art can use to provide optimal twist distributions for all of the blade applications discussed herein is EHPIC/HERO, available from Continuum Dynamics, Inc., 34 Lexington Ave., Ewing, N.J. 08618. The EHPIC/HERO computer code and the Continuum Dynamics manual for using the EHPIC/HERO program are incorporated herein by reference as if set out in full. Further information concerning the use of the EHPIC/HERO program can be found in Quackenbush, T. R., et al., "Performance Optimization for Rotors in Hover and Axial Flight," *NASA CR* 177524, April 1989, and in Quackenbush, T. R., et al., "Optimization of Rotor Performance in Hover Using A Free Wake Analysis," *Journal of Aircraft*, Vol. 28, No. 3, March 1991, pages 200–207. Those documents are also incorporated by reference as if set out in full herein.

The manner of optimizing rotor blade performance involves inputting the blade's geometric configuration and the aircraft performance parameters and using EHPIC/HERO to solve for the twist distribution that provides minimum power at a given constant thrust for that particular rotor blade.

While preferred embodiments of the invention have been depicted and described, it will be understood that various changes and modifications can be made other than those specifically mentioned above without departing from the spirit and scope of the invention, which is defined solely by the claims that follow.

What is claimed is:

1. A rotor blade including a blade root for attachment to a rotor hub for rotating said blade about an axis of rotation transverse to a blade span R between said axis of rotation and a distal end of said blade defining a blade tip, wherein said blade has a chord extending between a blade leading edge and a blade trailing edge transverse to the blade span and said chord has a local geometric twist angle $\theta = f(r/R)$, with r being the distance along the blade span from said axis of rotation, said blade comprising:

an inner region between an inner boundary at $(r/R)_{inner} = 0.20 \pm 0.04$ and a transition point at $(r/R)_{trans} = 0.75 \pm 0.04$, wherein $\theta_{inner}$ at $(r/R)_{inner}$ has a positive value and $\theta_{inner}$ is greater than or equal to $\theta_{trans}$ at $(r/R)_{trans}$; and a tip region between the transition point and said blade tip, said tip region including:

a first portion between $(r/R)_{trans}$ and $(r/R)_{min} > (r/R)_{trans}$, wherein $\theta$ continuously decreases from $\theta_{trans}$ to $\theta_{min}$ at $(r/R)_{min}$, and $\Delta\theta_{tip1} = |\theta_{min} - \theta_{trans}| > 3°$, and a second portion between $(r/R)_{min}$ and said blade tip, wherein $\theta$ continuously increases from $\theta_{min}$ to $\theta_{tip}$ at said blade tip, and $\Delta\theta_{tip2} = |\theta_{tip} - \theta_{min}|$ is at least about 3° and no greater than about 20°.

2. A rotor blade as in claim 1, wherein said blade root is adapted to be attached to a rotor hub of a tiltrotor aircraft, wherein $(r/R)_{min}=0.91\pm0.04$, $\Delta\theta_{tip1}=7.5°\pm2.5°$, and $\Delta\theta_{tip2}=10°\pm6°$.

3. A rotor blade as in claim 2, wherein $\Delta\theta_{inner}=|\theta_{inner}-\theta_{trans}|=32.5°\pm7.5°$ and $\theta$ continuously decreases from $(r/R)_{inner}$ to $(r/R)_{tans}$.

4. A rotor blade as in claim 3, wherein $\theta=f(r/R)$ is such that the difference between any two values $\theta$ at $(r/R)_n$ and $(r/R)_{n+1}$ is substantially in accordance with that in any one of the following three functions of r/R:

| r/R | $f_1$ (r/R) | $f_2$ (r/R) | $f_3$ (r/R) |
|---|---|---|---|
| 0.191 | 43.16 | 41.02 | 44.84 |
| 0.230 | 35.45 | 35.97 | 38.47 |
| 0.275 | 30.88 | 30.99 | 34.12 |
| 0.325 | 29.48 | 26.08 | 31.80 |
| 0.363 | 27.44 | 22.50 | 29.70 |
| 0.388 | 24.74 | 20.25 | 27.80 |
| 0.413 | 22.05 | 18.01 | 25.91 |
| 0.438 | 19.36 | 15.76 | 24.01 |
| 0.459 | 17.61 | 14.32 | 22.53 |
| 0.475 | 16.80 | 13.68 | 21.46 |
| 0.492 | 15.99 | 13.04 | 20.39 |
| 0.509 | 15.19 | 12.40 | 19.32 |
| 0.525 | 14.38 | 11.76 | 18.25 |
| 0.542 | 13.56 | 11.11 | 17.17 |
| 0.557 | 12.96 | 10.60 | 16.40 |
| 0.569 | 12.58 | 10.22 | 15.95 |
| 0.582 | 12.15 | 9.85 | 15.45 |
| 0.594 | 11.66 | 9.47 | 14.90 |
| 0.607 | 11.21 | 9.09 | 14.38 |
| 0.619 | 10.80 | 8.71 | 13.88 |
| 0.632 | 10.41 | 8.32 | 13.40 |
| 0.644 | 10.05 | 7.94 | 12.93 |
| 0.657 | 9.70 | 7.55 | 12.47 |
| 0.669 | 9.35 | 7.17 | 12.02 |
| 0.682 | 8.97 | 6.79 | 11.57 |
| 0.694 | 8.57 | 6.43 | 11.14 |
| 0.707 | 8.23 | 6.10 | 10.71 |
| 0.719 | 7.95 | 5.80 | 10.28 |
| 0.731 | 7.72 | 5.53 | 9.89 |
| 0.744 | 7.54 | 5.26 | 9.52 |
| 0.756 | 7.14 | 5.01 | 9.17 |
| 0.769 | 6.52 | 4.78 | 8.83 |
| 0.781 | 6.10 | 4.55 | 8.57 |
| 0.794 | 5.88 | 4.34 | 8.38 |
| 0.806 | 5.62 | 3.88 | 8.46 |
| 0.819 | 5.31 | 3.17 | 8.81 |
| 0.831 | 4.54 | 2.47 | 8.51 |
| 0.844 | 3.31 | 1.78 | 7.56 |
| 0.856 | 2.40 | 1.08 | 6.14 |
| 0.869 | 1.81 | 0.37 | 4.25 |
| 0.881 | 0.80 | −0.37 | 2.32 |
| 0.894 | −0.61 | −1.14 | 0.36 |
| 0.906 | −1.62 | −1.22 | −0.08 |
| 0.919 | −2.24 | −0.60 | 1.00 |
| 0.931 | −1.87 | 0.01 | 2.44 |
| 0.944 | −0.53 | 0.63 | 4.24 |
| 0.956 | 2.01 | 1.76 | 6.56 |
| 0.969 | 5.73 | 3.41 | 9.40 |
| 0.981 | 8.54 | 4.96 | 11.85 |
| 0.992 | 10.46 | 6.43 | 13.91 |
| 1.000 | 11.82 | 7.57 | 14.85. |

5. A rotor blade as in claim 1, wherein said blade root is adapted to be attached to a rotor hub of a helicopter, wherein $(r/R)_{min}=0.94\pm0.04$, $\Delta\theta_{tip1}=5°\pm2°$, and $\Delta\theta_{tip2}$ is from about 3° to about 10°.

6. A rotor blade as in claim 5, wherein $\theta=f(r/R)$ is such that the difference between any two values $\theta$ at $(r/R)_n$ and $(r/R)_{n+1}$ is substantially in accordance with that in any one of the following five functions of r/R:

| r/R | $f_1$ (r/R) | $f_2$ (r/R) | $f_3$ (r/R) | $f_4$ (r/R) | $f_5$ (r/R) |
|---|---|---|---|---|---|
| 0.756 | 6.90 | 6.90 | 7.04 | 6.83 | 6.99 |
| 0.769 | 6.74 | 6.74 | 6.84 | 6.58 | 6.74 |
| 0.781 | 6.56 | 6.56 | 6.63 | 6.31 | 6.47 |
| 0.794 | 6.37 | 6.37 | 6.41 | 6.02 | 6.19 |
| 0.806 | 6.16 | 6.16 | 6.18 | 5.71 | 5.85 |
| 0.819 | 5.95 | 5.95 | 5.93 | 5.38 | 5.48 |
| 0.831 | 5.69 | 5.69 | 5.66 | 5.02 | 5.08 |
| 0.844 | 5.39 | 5.39 | 5.35 | 4.62 | 4.65 |
| 0.856 | 5.11 | 5.11 | 5.01 | 4.17 | 4.17 |
| 0.869 | 4.83 | 4.83 | 4.64 | 3.67 | 3.61 |
| 0.881 | 4.57 | 4.57 | 4.23 | 3.13 | 3.03 |
| 0.894 | 4.32 | 4.32 | 3.78 | 2.57 | 2.42 |
| 0.906 | 4.01 | 4.01 | 3.39 | 2.02 | 1.82 |
| 0.919 | 3.64 | 3.64 | 3.06 | 1.50 | 1.23 |
| 0.931 | 3.44 | 3.44 | 2.91 | 1.25 | 0.93 |
| 0.944 | 3.43 | 3.43 | 2.94 | 1.29 | 0.91 |
| 0.956 | 3.98 | 3.98 | 3.35 | 1.74 | 1.26 |
| 0.969 | 5.11 | 5.11 | 4.11 | 2.59 | 1.99 |
| 0.981 | 6.17 | 6.17 | 4.88 | 3.40 | 2.75 |
| 0.992 | 7.17 | 7.17 | 5.65 | 4.17 | 3.52 |
| 1.000 | 7.90 | 7.90 | 6.21 | 4.73 | 4.08. |

7. A rotor blade as in claim 5, wherein $\Delta\theta_{inner}=|\theta_{inner}-\theta_{trans}|=20°\pm5°$ and $\theta$ continuously decreases from $(r/R)_{inner}$ to $(r/R)_{trans}$.

8. A rotor blade as in claim 7, wherein $\theta=f(r/R)$ is such that the difference between any two values $\theta$ at $(r/R)_n$ and $(r/R)_{n+1}$ is substantially in accordance with that in any one of the following five functions of r/R:

| r/R | $f_1$ (r/R) | $f_2$ (r/R) | $f_3$ (r/R) | $f_4$ (r/R) | $f_5$ (r/R) |
|---|---|---|---|---|---|
| 0.206 | 27.08 | 27.08 | 24.41 | 24.95 | 25.58 |
| 0.219 | 26.57 | 26.57 | 24.05 | 24.60 | 25.20 |
| 0.231 | 26.07 | 26.07 | 23.68 | 24.26 | 24.82 |
| 0.244 | 25.57 | 25.57 | 23.32 | 23.91 | 24.45 |
| 0.256 | 24.86 | 24.86 | 22.85 | 23.44 | 23.96 |
| 0.269 | 23.95 | 23.95 | 22.27 | 22.85 | 23.36 |
| 0.281 | 23.04 | 23.04 | 21.69 | 22.25 | 22.76 |
| 0.294 | 22.13 | 22.13 | 21.11 | 21.66 | 22.17 |
| 0.306 | 21.18 | 21.18 | 20.51 | 21.06 | 21.56 |
| 0.319 | 20.19 | 20.19 | 19.89 | 20.44 | 20.93 |
| 0.331 | 19.21 | 19.21 | 19.27 | 19.82 | 20.31 |
| 0.344 | 18.22 | 18.22 | 18.65 | 19.20 | 19.68 |
| 0.356 | 17.42 | 17.42 | 18.05 | 18.60 | 19.08 |
| 0.369 | 16.80 | 16.80 | 17.46 | 18.02 | 18.49 |
| 0.381 | 16.18 | 16.18 | 16.87 | 17.44 | 17.91 |
| 0.394 | 15.56 | 15.56 | 16.28 | 16.85 | 17.32 |
| 0.406 | 15.00 | 15.00 | 15.61 | 16.21 | 16.64 |
| 0.419 | 14.48 | 14.48 | 14.86 | 15.49 | 15.85 |
| 0.431 | 14.02 | 14.02 | 14.23 | 14.89 | 15.19 |
| 0.444 | 13.62 | 13.62 | 13.72 | 14.38 | 14.66 |
| 0.456 | 13.25 | 13.25 | 13.28 | 13.92 | 14.17 |
| 0.469 | 12.89 | 12.89 | 12.91 | 13.51 | 13.72 |
| 0.481 | 12.53 | 12.53 | 12.54 | 13.12 | 13.27 |
| 0.494 | 12.18 | 12.18 | 12.18 | 12.75 | 12.82 |
| 0.506 | 11.80 | 11.80 | 11.84 | 12.39 | 12.41 |
| 0.519 | 11.39 | 11.39 | 11.51 | 12.02 | 12.04 |
| 0.531 | 11.03 | 11.03 | 11.18 | 11.66 | 11.67 |
| 0.544 | 10.71 | 10.71 | 10.86 | 11.32 | 11.32 |
| 0.556 | 10.42 | 10.42 | 10.55 | 10.99 | 10.98 |
| 0.569 | 10.15 | 10.15 | 10.25 | 10.68 | 10.67 |
| 0.581 | 9.88 | 9.88 | 9.97 | 10.37 | 10.37 |
| 0.594 | 9.61 | 9.61 | 9.70 | 10.07 | 10.08 |
| 0.606 | 9.37 | 9.37 | 9.44 | 9.79 | 9.81 |
| 0.619 | 9.16 | 9.16 | 9.18 | 9.52 | 9.53 |
| 0.631 | 8.92 | 8.92 | 8.95 | 9.25 | 9.26 |
| 0.644 | 8.66 | 8.66 | 8.74 | 8.97 | 8.97 |
| 0.656 | 8.42 | 8.42 | 8.53 | 8.71 | 8.72 |
| 0.669 | 8.21 | 8.21 | 8.33 | 8.46 | 8.49 |
| 0.681 | 8.01 | 8.01 | 8.13 | 8.21 | 8.27 |
| 0.694 | 7.82 | 7.82 | 7.95 | 7.97 | 8.06 |

-continued

| r/R | $f_1$ (r/R) | $f_2$ (r/R) | $f_3$ (r/R) | $f_4$ (r/R) | $f_5$ (r/R) |
|---|---|---|---|---|---|
| 0.706 | 7.62 | 7.62 | 7.76 | 7.74 | 7.85 |
| 0.719 | 7.43 | 7.43 | 7.58 | 7.52 | 7.64 |
| 0.731 | 7.24 | 7.24 | 7.40 | 7.30 | 7.43 |
| 0.744 | 7.07 | 7.07 | 7.22 | 7.07 | 7.22 |
| 0.756 | 6.90 | 6.90 | 7.04 | 6.83 | 6.99 |
| 0.769 | 6.74 | 6.74 | 6.84 | 6.58 | 6.74 |
| 0.781 | 6.56 | 6.56 | 6.63 | 6.31 | 6.47 |
| 0.794 | 6.37 | 6.37 | 6.41 | 6.02 | 6.19 |
| 0.806 | 6.16 | 6.16 | 6.18 | 5.71 | 5.85 |
| 0.819 | 5.95 | 5.95 | 5.93 | 5.38 | 5.48 |
| 0.831 | 5.69 | 5.69 | 5.66 | 5.02 | 5.08 |
| 0.844 | 5.39 | 5.39 | 5.35 | 4.62 | 4.65 |
| 0.856 | 5.11 | 5.11 | 5.01 | 4.17 | 4.17 |
| 0.869 | 4.83 | 4.83 | 4.64 | 3.67 | 3.61 |
| 0.881 | 4.57 | 4.57 | 4.23 | 3.13 | 3.03 |
| 0.894 | 4.32 | 4.32 | 3.78 | 2.57 | 2.42 |
| 0.906 | 4.01 | 4.01 | 3.39 | 2.02 | 1.82 |
| 0.919 | 3.64 | 3.64 | 3.06 | 1.50 | 1.23 |
| 0.931 | 3.44 | 3.44 | 2.91 | 1.25 | 0.93 |
| 0.944 | 3.43 | 3.43 | 2.94 | 1.29 | 0.91 |
| 0.956 | 3.98 | 3.98 | 3.35 | 1.74 | 1.26 |
| 0.969 | 5.11 | 5.11 | 4.11 | 2.59 | 1.99 |
| 0.981 | 6.17 | 6.17 | 4.88 | 3.40 | 2.75 |
| 0.992 | 7.17 | 7.17 | 5.65 | 4.17 | 3.52 |
| 1.000 | 7.90 | 7.90 | 6.21 | 4.73 | 4.08 |

9. A rotor blade for a helicopter capable of hover and forward flight, said blade including a blade root for attachment to a rotor hub for rotating said blade about an axis of rotation transverse to a blade span R between said axis of rotation and a distal end of said blade defining a blade tip, wherein said blade has a chord extending between a blade leading edge and a blade trailing edge transverse to the blade span and said chord has a local geometric twist angle $\theta = f(r/R)$, with r being the distance along the blade span from said axis of rotation, said blade comprising:

an inner region between an inner boundary at $(r/R)_{inner} = 0.20 \pm 0.04$ and a transition point at $(r/R)_{trans} = 0.75 \pm 0.04$, wherein $\theta_{inner}$ at $(r/R)_{inner}$ has a positive value and $\theta_{inner}$ is greater than or equal to $\theta_{trans}$ at $(r/R)_{trans}$;

a mechanism for selectively providing along said blade span within said inner region at least two twist angle distributions while said helicopter is in flight, a first said twist angle distribution for hover flight and a second said twist angle distribution for forward flight, wherein $\Delta\theta_{inner1} = |\theta_{inner} - \theta_{trans}|$ for said first twist angle distribution is greater than $\Delta\theta_{inner2} = |\theta_{inner} - \theta_{trans}|$ for said second twist angle distribution; and a tip region extending from the transition point to said blade tip, said tip region including:
  a first portion between $(r/R)_{trans}$ and $(r/R)_{min} > (r/R)_{trans}$, wherein $\theta$ continuously decreases from $\theta_{trans}$ to $\theta_{min}$ at $(r/R)_{min}$, and $\Delta\theta_{tip1} = |\theta_{min} - \theta_{trans}| > 3°$, and
  a second portion between $(r/R)_{min}$ and said blade tip, wherein $\theta$ continuously increases from $\theta_{min}$ to $\theta_{tip}$ at said blade tip, and $\Delta\theta_{tip2} = |\theta_{tip} - \theta_{min}|$ is at least about 3° and no greater than about 20°.

10. A rotor blade as in claim 9, wherein $\Delta\theta_{inner1} = 20° \pm 5°$, $\Delta\theta_{inner2} = 5° \pm 2°$, $(r/R)_{min} = 0.94 \pm 0.04$, and $\Delta\theta_{tip1} =$ is from about 3° to about 10°.

11. A rotor blade as in claim 10, wherein for said second twist angle distribution a linearly decreases from r/R≈0.20 to r/R≈0.75.

12. A rotor blade as in claim 10, wherein:
said mechanism comprises a plurality of selectively actuatable trailing edge flaps disposed along said blade r/R≈0.20 to r/R≈0.70;

when said flaps are not actuated said blade in said inner region has said second twist angle distribution in which θ linearly decreases from r/R≈0.20 to r/R≈0.75; and said flaps are actuated in accordance with a predetermined schedule to cause said inner region to have said first twist angle distribution.

13. A rotor blade as in claim 9, wherein said mechanism is actuated in flight by one of a mechanical, electrical, electromechanical, pneumatic or hydraulic actuating device.

14. A rotor blade as in claim 9, wherein said mechanism comprises at least one of (a) trailing edge flaps, (b) leading edge flaps, (c) variable twist devices, (d) variable camber devices and (e) spoilers.

15. A rotor blade as in claim 14, further including a plurality of shape-memory alloy actuators for actuating said flaps while said helicopter is in flight.

16. A rotor blade as in claim 9, wherein said mechanism comprises a plurality of selectively actuatable trailing edge flaps disposed along said blade.

17. A tiltrotor aircraft capable of helicopter and airplane modes of flight, said tiltrotor aircraft comprising:

a wing for providing lift in the airplane mode of flight; and at least two powerplants, each said powerplant having a rotor hub to which a rotor having a plurality of blades is mounted for providing an aerodynamic force when said rotor hub is rotated by said powerplant, said powerplants being mounted to said tiltrotor aircraft for tilting between a hover position in which said rotor provides a lifting force to support said aircraft in the hover mode and a forward flight positioning which rotor provides a propulsive force for propelling said aircraft in the airplane mode of flight, wherein each said blade includes:
  a blade root for attachment to a rotor hub for rotating said blade about an axis of rotation transverse to a blade span R between said axis of rotation and a distal end of said blade defining a blade tip, wherein said blade has a chord extending between a blade leading edge and a blade trailing edge transverse to the blade span and said chord has a local geometric twist angle $\theta = f(r/R)$, with r being the distance along the blade span from said axis of rotation;
  an inner region between an inner boundary at $(r/R)_{inner} = 0.20 \pm 0.04$ and a transition point at $(r/R)_{trans} = 0.75 \pm 0.04$, wherein $\theta_{inner}$ at $(r/R)_{inner}$ has a positive value and $\theta_{inner}$ is greater than or equal to $\theta_{trans}$ at $(r/R)_{trans}$; and
  a tip region between the transition point and said blade tip, said tip region having:
    a first portion between $(r/R)_{trans}$ and $(r/R)_{min=(r/R)trans}$, wherein $\theta$ continuously decreases from $\theta_{trans}$ to $\theta_{min}$ at $(r/R)_{min}$, and $\Delta\theta_{tip1} = |\theta_{min} - \theta_{trans}| > 3°$, and
    a second portion between $(r/R)_{min}$ and said blade tip, wherein $\theta$ continuously increases from $\theta_{min}$ to $\theta_{tip}$ at said blade tip, and $\Delta\theta_{tip2} = |\theta_{tip} - \theta_{min}|$ is at least about 3° and no greater than about 20°.

18. A tiltrotor aircraft as in claim 17, wherein $(r/R)_{min} = 0.91 \pm 0.04$, $\Delta\theta_{tip1} = 7.50 \pm 2.5°$, and $\Delta\theta_{tip2} = \pm 6°$.

19. A tiltrotor aircraft as in claim 17, wherein $\Delta\theta_{inner} = |\theta_{inner} - \theta_{trans}| = 32.5° \pm 7.5°$ and θ continuously decreases from $(r/R)_{inner}$ to $(r/R)_{trans}$.

* * * * *